(12) United States Patent
Newman et al.

(10) Patent No.: US 12,055,797 B2
(45) Date of Patent: Aug. 6, 2024

(54) CONTACT LENS WITH SELECTIVE WAVELENGTH TRANSMITTANCE

(71) Applicant: MENICON SINGAPORE PTE LTD., Singapore (SG)

(72) Inventors: Stephen D. Newman, Bayshore Park (SG); Tasuku Watanabe, Singapore (SG)

(73) Assignee: Menicon Singapore PTE LTD., Singapore (SG)

( * ) Notice: Subject to any disclaimer, the term of this patent is extended or adjusted under 35 U.S.C. 154(b) by 297 days.

(21) Appl. No.: 17/086,180

(22) Filed: Oct. 30, 2020

(65) Prior Publication Data

US 2021/0132416 A1   May 6, 2021

Related U.S. Application Data

(60) Provisional application No. 62/928,991, filed on Oct. 31, 2019.

(51) Int. Cl.
   *G02C 7/10* (2006.01)
   *B29D 11/00* (2006.01)
   (Continued)

(52) U.S. Cl.
   CPC ........ *G02C 7/104* (2013.01); *B29D 11/00048* (2013.01); *B29D 11/00115* (2013.01);
   (Continued)

(58) Field of Classification Search
   CPC ...... G02C 7/104; G02C 7/04; G02C 2202/24; G02C 2202/16; G02C 7/10; B29D 11/00048; B29D 11/00115; B29D 11/00134; B29D 11/00634; B29D 11/0048; B29K 2083/005; B29K 2105/0061; B29K 2995/0018; B29K 2105/0044; B29C 35/0805

See application file for complete search history.

(56) References Cited

U.S. PATENT DOCUMENTS 5,120,121 A * 6/1992 Rawlings ............... G02C 7/046
                                              351/159.41
5,846,457 A   12/1998 Hoffman
(Continued)

FOREIGN PATENT DOCUMENTS

CN   103038055 B   12/2015
TW   200812790 A   3/2008
(Continued)

OTHER PUBLICATIONS

PCT Invitation to Pay Additional Fees and Partial Search Report for PCT/SG2020/050630 dated Jan. 12, 2021.
(Continued)

*Primary Examiner* — Balram T Parbadia
*Assistant Examiner* — Gabriel A Sanz
(74) *Attorney, Agent, or Firm* — Dorsey & Whitney LLP

(57) ABSTRACT

A contact lens includes a body, a filtering characteristic of blocking at least some light with wavelengths between 400 nanometers and 500 nanometers from transmitting through the body, and a transmittance characteristic of transmitting at least some light with wavelengths above 500 nanometers through the body.

22 Claims, 14 Drawing Sheets

(51) Int. Cl.
  *G02C 7/04* (2006.01)
  *B29K 83/00* (2006.01)
  *B29K 105/00* (2006.01)
(52) U.S. Cl.
  CPC .......... *G02C 7/04* (2013.01); *B29K 2083/005* (2013.01); *B29K 2105/0061* (2013.01); *B29K 2995/0018* (2013.01); *G02C 2202/24* (2013.01)

(56) References Cited

U.S. PATENT DOCUMENTS

| | | | |
|---|---|---|---|
| 6,635,730 B1* | 10/2003 | Jiang | G02B 1/041 351/159.01 |
| 9,193,119 B2 | 11/2015 | Newman | |
| 2002/0004574 A1* | 1/2002 | Hung | C08F 22/1006 526/321 |
| 2002/0146161 A1* | 10/2002 | Suzuki | B29D 11/0098 382/141 |
| 2013/0083286 A1* | 4/2013 | Li | B29D 11/00317 351/159.02 |
| 2014/0220352 A1 | 8/2014 | Gross et al. | |
| 2015/0168605 A1* | 6/2015 | Ying | G02B 1/043 252/589 |
| 2016/0054475 A1 | 2/2016 | Wang et al. | |
| 2016/0085090 A1* | 3/2016 | Harding | G02C 7/104 351/159.6 |
| 2016/0116764 A1* | 4/2016 | Newman | B29D 11/00865 351/159.28 |
| 2017/0276959 A1* | 9/2017 | Bowers | G02C 7/021 |
| 2018/0341122 A1 | 11/2018 | Shioya et al. | |
| 2019/0002459 A1* | 1/2019 | Mahadevan | C08F 230/08 |
| 2020/0095187 A1* | 3/2020 | Arnold | A61F 2/1451 |

FOREIGN PATENT DOCUMENTS

| | | |
|---|---|---|
| TW | 201825569 A | 7/2018 |
| WO | 2008003012 A2 | 1/2008 |
| WO | 2010111499 A1 | 9/2010 |

OTHER PUBLICATIONS

Partial Supplementary European Search Report dated Nov. 28, 2023 for EP Application No. 20881863.3.

"Extended European Search Report" for EP Application No. 20881863.3, dated Feb. 20, 2024, 13 pages.

"Search Report" for TW Application No. 109138108, mailed Feb. 15, 2024, 1 page.

* cited by examiner

1400

```
┌─────────────────────────────────────────────────┐
│ Apply a liquid lens material into a spin casting mold │
│ where the liquid material includes a blocking agent that │
│ has a characteristic of blocking at least some light with │ ~1402
│ wavelengths between 400 nanometers and 500 │
│ nanometers from passing through the liquid lens material │
└─────────────────────────────────────────────────┘
                        │
                        ▼
┌─────────────────────────────────────────────────┐
│           Spin the spin casting mold            │ ~1404
└─────────────────────────────────────────────────┘
```

*Fig. 17*

CONTACT LENS WITH SELECTIVE WAVELENGTH TRANSMITTANCE

CROSS-REFERENCE TO RELATED APPLICATION

This application claims the benefit of priority to U.S. Provisional Application No. 62/928,991 entitled "Contact Lens with Selective Wavelength Transmittance," filed 31 Oct. 2019, the disclosure of which is hereby incorporated by reference in its entirety.

FIELD

The present disclosure relates to the field of ocular lenses, particularly to ocular lenses having surface structures for controlling friction.

BACKGROUND

Emmetropia is a state of vision where a viewer sees objects clearly at both near and far distances. The cornea and crystalline lens collectively focus the light entering the eye to the central regions of the retina. Emmetropia is achieved when the collective refractive powers of the cornea and crystalline lens focus light exactly on the central portion of the retina.

Myopia is a vision condition where objects near to a viewer appear clear, but objects that are spaced farther away from the viewer get progressively blurred. Myopia is sometimes referred to as being nearsighted. Myopia can be caused by multiple reasons. A significant factor in many cases of myopia is an elongated axial length of the eye. Myopia occurs when the focal point of the focused light is formed before the retina. In other words, the focal point of the light rays entering the eye stop short of the retina.

Another condition that is affected by the eye's axial length is hyperopia. This condition causes the viewer to see objects at a distance clearly, while the objects close to the viewer are progressively blurred. While this condition can occur for multiple reasons as well, a person has hyperopia if the focal point of the light focused by the eye is formed behind the retina.

The axial length of the eye grows as children age. As young people begin their young adulthood years, the eye generally stops growing and the axial length of the eye becomes more permanent. Thus, if the growth of the eye's axial length can be controlled during a child's youth, myopia or hyperopia can be reduced or even eliminated in adulthood. Accordingly, it can be desirable for apparatuses, systems, and methods to control the growth of the eye's axial length during any stage of life where the axial length is capable of growing.

SUMMARY

A number of representative examples are provided to illustrate the various features, characteristics, and advantages of the disclosed user matter. It should be understood that the features, characteristics, advantages, etc., described in connection with one example can be used separately or in various combinations and sub-combinations with other features described in connection with other examples.

In one example, a contact lens includes a body, a filtering characteristic of blocking at least some light with wavelengths between 400 nanometers and 500 nanometers from transmitting through the body, and a transmittance characteristic of transmitting at least some light with wavelengths above 500 nanometers through the body.

Blocking at least some of the light with wavelengths between 400 nanometers and 500 nanometers may include blocking 100 percent of the light with wavelengths between 400 nanometers and 500 nanometers.

Blocking at least some of the light with wavelengths between 400 nanometers and 500 nanometers may include blocking at least 90 percent of the light with wavelengths between 400 nanometers and 500 nanometers.

Blocking at least some of the light with wavelengths between 400 nanometers and 500 nanometers may include blocking at least 80 percent of the light with wavelengths between 400 nanometers and 500 nanometers.

Blocking at least some of the light with wavelengths between 400 nanometers and 500 nanometers may include blocking at least 70 percent of the light with wavelengths between 400 nanometers and 500 nanometers.

Blocking at least some of the light with wavelengths between 400 nanometers and 500 nanometers may include blocking at least 50 percent of the light with wavelengths between 400 nanometers and 500 nanometers.

Blocking at least some of the light with wavelengths between 400 nanometers and 500 nanometers includes blocking at least some of the light with wavelengths between 400 nanometers and 450 nanometers and transmitting at least some of the light between 450 nanometers and 500 nanometers.

Blocking at least some of the light with wavelengths between 400 nanometers and 450 nanometers includes blocking 100 percent of the light with wavelengths between 400 nanometers and 450 nanometers.

Blocking at least some of the light with wavelengths between 400 nanometers and 450 nanometers includes blocking at least 90 percent of the light with wavelengths between 400 nanometers and 450 nanometers.

Blocking at least some of the light with wavelengths between 400 nanometers and 450 nanometers includes blocking at least 80 percent of the light with wavelengths between 400 nanometers and 450 nanometers.

Blocking at least some of the light with wavelengths between 400 nanometers and 450 nanometers includes blocking at least 70 percent of the light with wavelengths between 400 nanometers and 450 nanometers.

Blocking at least some of the light with wavelengths between 400 nanometers and 450 nanometers includes blocking at least 50 percent of the light with wavelengths between 400 nanometers and 450 nanometers The body may be made, at least in part, of a polymer.

The contact lens may include a blocking agent is incorporated into the polymer where the blocking agent causes the filtering characteristic.

The blocking agent may include at least triphenylphosphine.

The blocking agent may include at least 2-[3-(2H-Benzotriazol-2-yl)-4-hydroxyphenyl]ethyl methacrylate.

The blocking agent may make up at least 1.0 percent of the contact lens by weight.

The blocking agent may make up at least 5.0 percent of the contact lens by weight.

The blocking agent may make up at least 10.0 percent of the contact lens by weight.

The blocking agent may make up at least 15.0 percent of the contact lens by weight.

The blocking agent may make up at least 25.0 percent of the contact lens by weight.

The contact lens may include an optic zone of the body where the blocking agent is located within the optic zone.

The contact lens may include a peripheral zone of the body where the blocking agent is located within the peripheral zone.

The polymer may include a silicone material.

The polymer may include a hydrogel material.

The contact lens may include a second transmittance characteristic of transmitting at least some light with wavelengths below 400 nanometers through the body.

The second transmittance characteristic may include transmitting at least some of the light with wavelength ranges between 360 nanometers and 400 nanometers.

The second transmittance characteristic may include transmitting at least some of the light with wavelength ranges between 360 nanometers and 370 nanometers.

The second transmittance characteristic includes transmitting at least some of the light with wavelength ranges between 360 nanometers and 380 nanometers.

The second transmittance characteristic may include transmitting at least some of the light with wavelength ranges between 370 nanometers and 380 nanometers.

The second transmittance characteristic may include transmitting at least some of the light with wavelength ranges between 380 nanometers and 390 nanometers.

The second transmittance characteristic may include transmitting at least some of the light with wavelength ranges between 390 nanometers and 400 nanometers.

The second transmittance characteristic may include transmitting 100 percent of the light with wavelengths between 360 nanometers and 400 nanometers through the body.

The second transmittance characteristic may include transmitting at least 90 percent of the light with wavelengths between 360 nanometers and 400 nanometers through the body.

The second transmittance characteristic may include transmitting at least 80 percent of the light with wavelengths between 360 nanometers and 400 nanometers through the body.

The second transmittance characteristic may include transmitting at least 70 percent of the light with wavelengths between 360 nanometers and 400 nanometers through the body.

The second transmittance characteristic may include transmitting at least 50 percent of the light with wavelengths between 360 nanometers and 400 nanometers through the body.

The second transmittance characteristic includes transmitting 100 percent of the light with wavelengths between 360 nanometers and 380 nanometers through the body.

The second transmittance characteristic includes transmitting at least 90 percent of the light with wavelengths between 360 nanometers and 380 nanometers through the body.

The second transmittance characteristic includes transmitting at least 80 percent of the light with wavelengths between 360 nanometers and 380 nanometers through the body.

The second transmittance characteristic includes transmitting at least 70 percent of the light with wavelengths between 360 nanometers and 380 nanometers through the body.

The second transmittance characteristic includes transmitting at least 50 percent of the light with wavelengths between 360 nanometers and 380 nanometers through the body.

The contact lens may further include a third transmittance characteristic of enhancing light with wavelengths between 360 nanometers and 400 nanometers via absorption and fluorescence in the body.

The third transmittance characteristic includes absorbing at least some of the light with wavelength ranges below 360 nanometers and above 400 nanometers and emitting at least some light with wavelength ranges between 360 nanometers and 400 nanometers.

The contact lens may be an orthokeratology lens.

The contact lens may be a rigid gas permeable lens.

The contact lens may be soft contact lens.

In one example, a method of controlling myopia progression/onset includes providing a contact lens and instructing the user to wear the contact lens. The contact lens may include a filtering characteristic of blocking at least some light with wavelengths between 400 nanometers and 500 nanometers from transmitting through the body, a transmittance characteristic of transmitting at least some light with wavelengths above 500 nanometers through the body, and a second transmittance characteristic of transmitting at least some light with wavelengths below 400 nanometers through the body.

The second transmittance characteristic may include transmitting at least some of the light with wavelength ranges between 360 nanometers and 400 nanometers.

The second transmittance characteristic may include transmitting at least some of the light with wavelength ranges between 360 nanometers and 370 nanometers.

The second transmittance characteristic may include transmitting at least some of the light with wavelength ranges between 360 nanometers and 380 nanometers.

The second transmittance characteristic may include transmitting at least some of the light with wavelength ranges between 370 nanometers and 380 nanometers.

The second transmittance characteristic may include transmitting at least some of the light with wavelength ranges between 380 nanometers and 390 nanometers.

The second transmittance characteristic may include transmitting at least some of the light with wavelength ranges between 390 nanometers and 400 nanometers.

The second transmittance characteristic may include transmitting at least 90 percent of the light with wavelengths between 360 nanometers and 400 nanometers through the body.

The second transmittance characteristic may include transmitting at least 70 percent of the light with wavelengths between 360 nanometers and 400 nanometers through the body.

The second transmittance characteristic may include transmitting at least 50 percent of the light with wavelengths between 360 nanometers and 400 nanometers through the body.

The second transmittance characteristic includes transmitting at least 90 percent of the light with wavelengths between 360 nanometers and 380 nanometers through the contact lens.

The second transmittance characteristic includes transmitting at least 70 percent of the light with wavelengths between 360 nanometers and 380 nanometers through the contact lens.

The second transmittance characteristic includes transmitting at least 50 percent of the light with wavelengths between 360 nanometers and 380 nanometers through the contact lens.

The contact lens may further include a third transmittance characteristic of enhancing light with wavelengths between 360 nanometers and 400 nanometers via absorption and fluorescence in the body.

The third transmittance characteristic includes absorbing at least some of the light with wavelength ranges below 360 nanometers and above 400 nanometers and emitting at least some light with wavelength ranges between 360 nanometers and 400 nanometers.

The method may include communicating to the user that wearing the initial contact lens has a potential to slow myopia progression where the user is diagnosed with myopia.

The method may include communicating to the user that wearing the initial contact lens has a potential to prevent myopia onset where the user is not diagnosed with myopia.

The method may include communicating to the user that wearing the initial contact lens has a potential to delay myopia onset where the user is not diagnosed with myopia.

The user may be under 5 years old.

The user may be between 3 years old and 12 years old.

Blocking at least some of the light with wavelengths between 400 nanometers and 500 nanometers may include blocking at least 90 percent of the light with wavelengths between 400 nanometers and 500 nanometers.

Blocking at least some of the light with wavelengths between 400 nanometers and 500 nanometers may include blocking at least 70 percent of the light with wavelengths between 400 nanometers and 500 nanometers.

Blocking at least some of the light with wavelengths between 400 nanometers and 500 nanometers may include blocking at least 50 percent of the light with wavelengths between 400 nanometers and 500 nanometers.

The body may be made, at least in part, of a polymer.

The body may include a blocking agent is incorporated into the polymer and the blocking agent causes the filtering characteristic.

The blocking agent may include at least triphenylphosphine.

The blocking agent may include at least 2-[3-(2H-Benzotriazol-2-yl)-4-hydroxyphenyl]ethyl methacrylate.

The blocking agent may make up at least 1.0 percent of the contact lens by weight.

The blocking agent may make up at least 5.0 percent of the contact lens by weight.

The blocking agent may make up at least 10.0 percent of the contact lens by weight.

The contact lens may include an optic zone of the body and the blocking agent is located within the optic zone.

The contact lens may include a peripheral zone of the body and the blocking agent is located within the peripheral zone.

The polymer may include a silicone material.

The polymer may include a hydrogel material.

In one example, a method of making a contact lens includes applying a liquid lens material into a spin casting mold and spinning the spin casting mold. The liquid material includes a blocking agent that has a characteristic of blocking at least some light with wavelengths between 400 nanometers and 500 nanometers from passing through the liquid lens material.

The method may include at least partially curing the liquid lens material to form a contact lens.

The contact lens may have the characteristic of blocking at least some light with wavelengths between 400 nanometers and 500 nanometers from passing through the contact lens.

In one example, a method of making a contact lens may include applying a first liquid lens material into a spin casting mold, spinning the spin casting mold, at least partially curing the first liquid lens material, and applying a second material to the first liquid lens material where the second material includes the blocking agent having a characteristic of blocking at least some light with wavelengths between 400 nanometers and 500 nanometers from passing through the liquid lens material.

The second material may be a second liquid lens material.

Applying the second material to the first liquid lens material may include applying the second material in the spin casting mold.

Applying the second material to the first liquid lens material may include injecting the second material into the first liquid lens material.

Applying the second material to the first liquid lens material may include infiltrating the first liquid lens material through an atmospheric pressure.

Applying the second material to the first liquid lens material may include absorbing the second material into the first liquid lens material.

The first liquid lens material may be without the blocking agent.

The method may include curing the first liquid lens material and the second material together.

The method may include applying an additional liquid lens material to the second material to the first liquid lens material or the second material.

The method may include the second material is between the first liquid lens material and the additional liquid lens material.

The method may include curing the additional liquid lens material.

The method may include curing the additional liquid lens material cross links the additional liquid lens material to the first liquid lens material.

The method may include curing the additional liquid lens material cross links the additional liquid lens material to the second material.

The method may include at least partially curing the first liquid lens material includes exposing the liquid lens material to actinic radiation.

In one example, a contact lens includes a cast body. The cast body includes a filtering characteristic of blocking at least some light with wavelengths between 400 nanometers and 500 nanometers from transmitting through the body, a transmittance characteristic of transmitting at least some light with wavelengths above 500 nanometers through the body, and a second transmittance characteristic of transmitting at least some light with wavelengths below 400 nanometers through the body.

The contact lens may include a blocking agent that causes the filtering characteristics.

The blocking agent may be at least one of triphenylphosphine or another blocking agent.

The contact lens may include an optic zone of the cast body where the blocking agent is located within the optic zone.

The contact lens may include a peripheral zone of the cast body where the blocking agent is located within the peripheral zone.

The cast body may include a silicone material.

The cast body may include a hydrogel material.

The cast body may include a second filtering characteristic of blocking at least some light with wavelengths below 360 nanometers from transmitting through the body.

The light with wavelengths below 360 nanometers may include ultraviolet light A light.

The light with wavelengths below 360 nanometers may include ultraviolet light B light.

The contact lens may include a second blocking agent that causes the second filtering characteristic.

The second blocking agent may include titanium dioxide, oxybenzone, octyl salicylate, octocrylene, octyl methoxycinnamate, other blocking agents, or combinations thereof.

The contact lens may further include a third transmittance characteristic of enhancing light with wavelengths between 360 nanometers and 400 nanometers via absorption and fluorescence in the body.

The third transmittance characteristic includes absorbing at least some of the light with wavelength ranges below 360 nanometers and above 400 nanometers and emitting at least some light with wavelength ranges between 360 nanometers and 400 nanometers.

BRIEF DESCRIPTION OF THE DRAWINGS

The accompanying drawings illustrate various examples of the principles described herein and are part of the specification. The illustrated examples are merely examples and do not limit the scope of the claims.

FIG. 17 is a block diagram of a method for making a contact.

Throughout the drawings, like and identical reference numbers designate similar, but not necessarily identical, elements.

DETAILED DESCRIPTION

Figure 1:
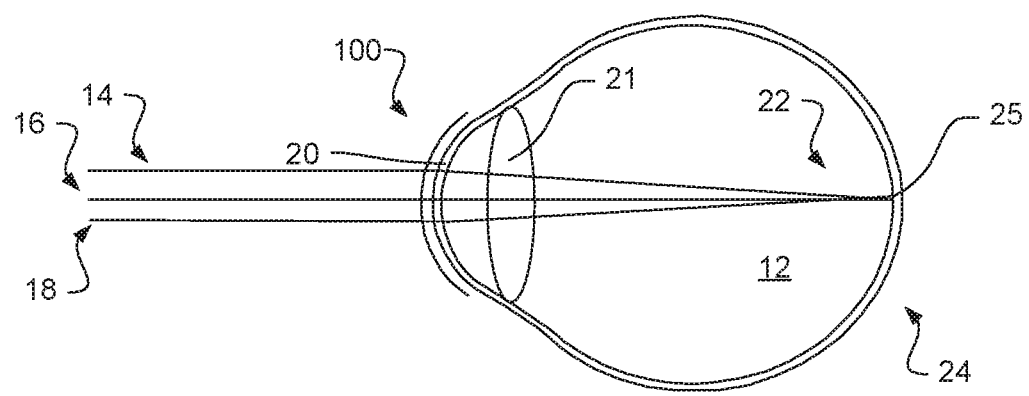
FIG. 1 is a cross-sectional view of a contact lens directing light into an eye.

Blue light is generally considered to have a wavelength range centered around 475 nanometers. Blue light is abundant in natural light, that is, light from the sun, but the amounts of blue light changes throughout the day. Blue light tends to decrease as the sun progresses towards setting at the end of day light hours. Based on the changing amount of blue light throughout the day, human bodies calibrate their circadian rhythm. Blue light is often abundantly emitted from digital screens including light-emitting diodes (LEDs), televisions, and mobile devices. Blue light from these devices is considered to be a factor for some who have trouble falling asleep at night, especially when these devices are used shortly before retiring to bed. Additionally, large amounts of exposure to blue light in young children is considered to be a contributing factor to generating macular degeneration and other ocular illnesses later in life. Generally, adults have an increased amount of compounds in the vitreous chamber of the eye that absorb blue light before the blue light reaches the retina. Children, however, do not have the same protections from blue light while their eyes are still changing and reaching their full size and development. Thus, children are considered to be more vulnerable to at least some of the effects of blue light than adults.

High levels of ultraviolet (UV) light, which generally has wavelengths below 360 nanometers, are also considered to be unhealthy for the human eye. Most UV-C light is filtered out by atmospheric ozone, and UV-A and UV-B light generally never reaches the eye's retina because light at these wavelengths are generally filtered out by the cornea and the crystalline lens. High exposure of the cornea and crystalline lens to UV light, however, can cause cataracts and other types of damage.

Violet light, which has wavelengths generally between 360 nanometers and 400 nanometers, has wavelengths that are between those of UV light and blue light. Often, man-made light sources that produce large amounts of blue light, such as mobile devices, televisions, and LEDs, do not produce significant amounts of violet light. In some cases, violet light may have a positive influence on either preventing the onset of myopia or reducing the progression of myopia. Without wishing to be bound to any one theory, the violet light that reaches the retina provides a biological feedback that triggers pathways resulting in an increased production of certain proteins that are associated with the prevention of myopia or slowing of the progression of myopia. This visual feedback can be used to balance the axial length of the eye with the collective focusing ability of the cornea and crystalline lens. The eye uses the focal point of the light on the retina to determine when the eye's axial length is balanced.

Often, spectacles that filter UV light and blue light also block and/or filter light with wavelengths spanning from the UV wavelengths and the blue light wavelengths, which also results in blocking and/or filtering the violet light wavelengths. Thus, a user risks blocking violet light when using sunglasses or other eyewear that are designed to block both UV light and blue light. Over time, blocking violet light may result in a violet light deficiency, which may contribute to a myopic condition of a user.

Without agreeing or disagreeing with these theories, contact lenses described herein can be used to slow myopia progression and/or prevent myopia progression onset by selectively filtering light with certain wavelengths while permitting transmittance of light with other desired wavelengths. In certain examples, the transmitted wavelengths are between ranges of wavelengths that are filtered and/or blocked.

Generally, a child's eye experiences significant growth during the first three years of life compared to the rest of the youth's childhood. Often, an individual's eye finishes growing by the time the individual is 18 years old. In situations where a user is in an in-door environment that mostly produces blue light without producing violet light, such as an environment with lighting by LED lights, a young child may not receive sufficient quantities of violet light to prevent myopia during these critical years. Thus, these children may be prone to developing myopia based on environmental factors.

The contact lenses described herein and the methods for controlling myopia progression and/or myopia onset with the contact lenses may be applied to those who are experiencing or are prone to childhood onset myopia, in addition to any other user or users. In some portions of the world, such as many parts of Asia, childhood onset myopia affects most children. The contact lenses described herein may be used by both those children who are diagnosed with myopia and those who are not diagnosed with myopia, but have hereditary indicators or environmental indicators that the child is prone to develop myopia, as well as any other children. The contact lens described herein transmits healthy amounts of light within certain wavelengths while blocking other types of wavelengths that can prevent the eyes from developing childhood onset myopia or halting the progress of childhood onset myopia. The users, such as children, may wear the contact lens until their 18 th birthdays or until another milestone that is determined to coincide with when the eye is believed to stop growing or stop being affected by violet light. While the eye may be more prone to rapid growth when the child is young, the user may continue to wear the contact lens until an older age to ensure that myopia progression does not relapse after the user stops wearing the contact lenses. While these methods are described with particular relevance for childhood onset myopia, at least some of these principles may be applied for those who are experiencing or prone to experiencing adult onset myopia.

Traditionally, contact lenses are shaped through a process involving a lathe. The contact lenses described herein may be made with a lathe. In some examples, however, the contact lenses described herein can be made with a cast moulding (both non-assembled and assembled type) or spin casting processes that enables exact copies of contact lenses to be made at a more cost effective rate. The contact lenses described herein can also be made by any combination of additive or subtractive manufacturing processes, either known in the art or developed in the future.

FIG. 1 is cross-sectional view of a contact lens 100 allowing light into an eye 12. In this example, the contact lens 100 is placed over the eye 12. Ambient light rays 14, 16, 18 enter the eye 12 after having passed through the contact lens 100. These rays of light are naturally focused by the cornea 20 and crystalline lens 21 of the eye towards a central region 22 of the retina 24. In this example, the contact lens maintains the natural focus of the light. In other words, in this example, the focal point 25 of the light rays 14, 16, 18 is on the central region 22 of the retina 24 whether or not the contact lens is worn. In other examples, however, the contact lens 100 may affect or adjust where the focal point of light lands. While these examples depict the light focused on the central region 22 of the retina, light may be naturally focused or defocused on either the central region of the retina or the peripheral regions of the retina as well. In some examples, the contact lens changes the focal points of the light directed towards the peripheral regions of the eye 12, while in other examples, the contact lens maintains the natural peripheral focus of the light.

In the illustrated example, the contact lens 100 is depicted as being spaced apart from the eye 12 for illustrative purposes. The contact lens 100 may directly contact portions of the cornea 21, the sclera, other portions of the eye 12, or combinations thereof. In some circumstances, the contact lens 100 may have a direct contact with all portions of the eye 12 that are adjacent to the contact lens 100. In other examples, some portions of the contact lens 100 may be spaced from the eye 12 so that the eye 12 has no contact in those particular regions with the contact lens 100, but where the eye 12 is in direct contact with other portions of the eye 12. In one of these types of examples, the periphery of the contact lens 100 may be in direct contact with the eye 12 while the central portion of the lens 100 is not in direct contact with the eye 12. In some circumstances where some portions of the lens 100 are not in direct contact with the eye 12, these portions may be in indirect contact with the eye 12 through a liquid, such as a tear liquid. Where a gap between the eye 12 and the contact lens 100 exists, these gaps may be filled with tear liquid produced by the tear duct.

In other examples, the pressure on the eye 12 provided from the contact lens 100 may be uniform across the entire region where the contact lens 100 covers the eye 12. In other examples, the pressure on the eye 12 may vary across the regions that are covered with the contact lens 100. In one example, the highest pressure exerted from the contact lens 100 is on the corneal portions of the eye 12. In another example, the highest pressure exerted from the contact lens 100 is in the scleral portions of the eye 12. In yet another example, the highest pressures exerted on the eye 12 are at a transition between the corneal portions of the eye 12 and the scleral portions of the eye 12. In those examples where the highest pressure is exerted on the corneal portions of the eye 12, the pressure may be uniformly applied. But, in other examples, the pressures exerted on the cornea 21 may vary across the corneal portions of the eye 12. For example, the highest pressure on the corneal portions of the eye 12 may be those portions that correspond to the pupil of the eye 12, while a lower or negative pressure is exerted onto the portions of the cornea 21 that correspond with the iris of the eye 12.

Any appropriate type of contact lens 100 may be used in accordance with the principles described in the present disclosure. For example, the contact lens 100 may be a soft contact lens, rigid gas permeable contact lens, an Ortho-K contact lens, a composite contact lens, an eye coloring lens, another type of contact lens, or combinations thereof. In some examples, the contact lens 100 is layered. In one particular example, a layer of the contact lens 100 that contains a blocking agent may be sandwiched between two other layers of the contact lens 100. A non-exhaustive list of materials that may be incorporated into or comprise a suitable contact lens 100 include silicone material, a hydrogel material, tefilcon, tetrafilcon A, crofilcon, helfilcon A&B, mafilcon, polymacon, hioxifilcon B, lotrafilcon A, lotrafilcon B, galyfilcon A, senofilcon A, sifilcon A, comfilcon A, enfilcon A, lidofilcon B, surfilcon A, lidofilcon A, alfafilcon A, omafilcon A, vasurfilcon A, hioxifilcon A, hioxifilcon D, nelfilcon A, hilafilcon A, acofilcon A, bufilcon A, deltafilcon A, phemfilcon A, bufilcon A, perfilcon, etafilcon A, focofilcon A, ocufilcon B, ocufilcon C, ocufilcon D ocufilcon E, ocufilcon F, phemfilcon A, methafilcon A, methafilcon B, vilfilcon A, other types of polymers, or combinations thereof. These materials may include various combinations of monomers, polymers, blocking agents, and other materials to form the final polymer. For example, common components of these materials may include HEMA, HEMA-GMA, and the like.

Figure 2:
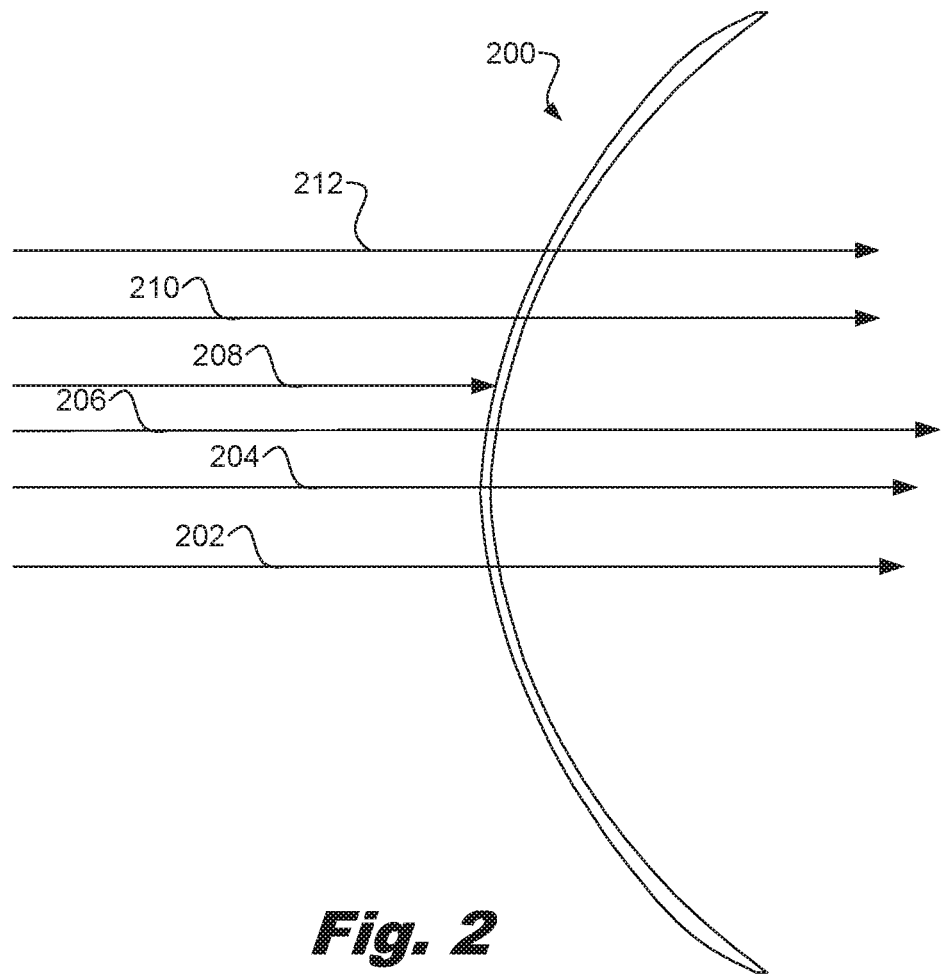
FIG. 2 is a cross-sectional view of one a contact lens.

FIG. 2 depicts an example of a contact lens 200 that has transmittance characteristics. The contact lens 200 may be substantially similar to and include some or all of the feature of any of the contact lenses described herein. In this example, UV-A light is schematically represented with arrow 202, UV-B light is schematically represented with arrow 204, violet light is schematically represented with arrow 206, blue light is schematically represented with arrow 208, green light is schematically represented with arrow 210, and yellow light is schematically represented with arrow 212. In this example, the contact lens 200 includes a transmittance characteristic of transmitting UV-A light, UV-B light, violet light, green light, and yellow light through the contact lens. In this example, the contact lens 200 includes the filtering characteristic of blocking at least some of the blue light from passing through the contact lens. For example, the transmittance characteristic may include transmitting all light that has a wavelength above 500 nanometers. Further, in some examples, the transmittance characteristic may include transmitting all light with wavelengths below 400 nanometers.

While this example depicts just certain types of light that are transmitted through the contact lens 200, other types of light that are not depicted may also be transmitted through the lens 200. For example, all other types of light may be transmitted through the contact lens 200 except for blue light. In other examples, just the other types of visual light may be transmitted through the contact lens 200, which may include red light, orange light, indigo light, and/or other types of light.

In some examples, the filtering characteristic may also block other types of light with wavelengths adjacent to the wavelengths of the blue light, such as some portions of the indigo light and the green light. In some examples, the filtering characteristic blocks at least some of the light with wavelengths within a range of 400 nanometers to 500 nanometers. In some examples, the filtering characteristic blocks at least some of the light with wavelengths within a range of 400 nanometers to 450 nanometers. In some examples, the filtering characteristic blocks at least some of the light with wavelengths below about 360 nanometers, or below about 280 nanometers.

In some examples, blocking at least some of the light with wavelengths between 400 nanometers and 500 nanometers includes blocking 100 percent of the light with wavelengths between 400 nanometers and 500 nanometers, blocking at least 90 percent of the light with wavelengths between 400 nanometers and 500 nanometers, blocking at least 80 percent of the light with wavelengths between 400 nanometers and 500 nanometers, blocking at least 70 percent of the light with wavelengths between 400 nanometers and 500 nanometers, blocking at least 50 percent of the light with wavelengths between 400 nanometers and 500 nanometers blocking another percent of the light with wavelengths between the 400 nanometer and 500 nanometer range, or combinations thereof. In some examples, where the blocking agent blocks just a percentage of light within the 400 nanometer to 500 nanometer range, the blocking agent blocks 100 percent of just certain wavelengths within that range. In other examples, the blocking agents block a wide ranges of wavelengths, but just of percentage of those wavelengths that they block.

In some examples, blocking at least some of the light with wavelengths between 400 nanometers and 450 nanometers includes blocking 100 percent of the light with wavelengths between 400 nanometers and 450 nanometers, blocking at least 90 percent of the light with wavelengths between 400 nanometers and 450 nanometers, blocking at least 80 percent of the light with wavelengths between 400 nanometers and 450 nanometers, blocking at least 70 percent of the light with wavelengths between 400 nanometers and 450 nanometers, blocking at least 50 percent of the light with wavelengths between 400 nanometers and 450 nanometers blocking another percent of the light with wavelengths between the 400 nanometer and 450 nanometer range, or combinations thereof. In some examples, where the blocking agent blocks just a percentage of light within the 400 nanometer to 450 nanometer range, the blocking agent blocks 100 percent of just certain wavelengths within that range. In other examples, the blocking agents block a wide ranges of wavelengths, but just of percentage of those wavelengths that they block.

In some examples, blocking at least some of the light with wavelengths below 360 nanometers includes blocking 100 percent of the light with wavelengths below 360 nanometers, blocking at least 90 percent of the light with wavelengths below 360 nanometers, blocking at least 80 percent of the light with wavelengths below 360 nanometers, blocking at least 70 percent of the light with wavelengths below 360 nanometers, blocking at least 50 percent of the light with wavelengths below 360 nanometers, blocking another percentage of the light with wavelengths below 360 nanometers, or combinations thereof. In some examples, where the blocking agent blocks just a percentage of light below 360 nanometers, the blocking agent blocks 100 percent of just certain wavelengths within that range. In other examples, the blocking agents block a wide ranges of wavelengths, but just of percentage of those wavelengths that they block.

Figure 3:
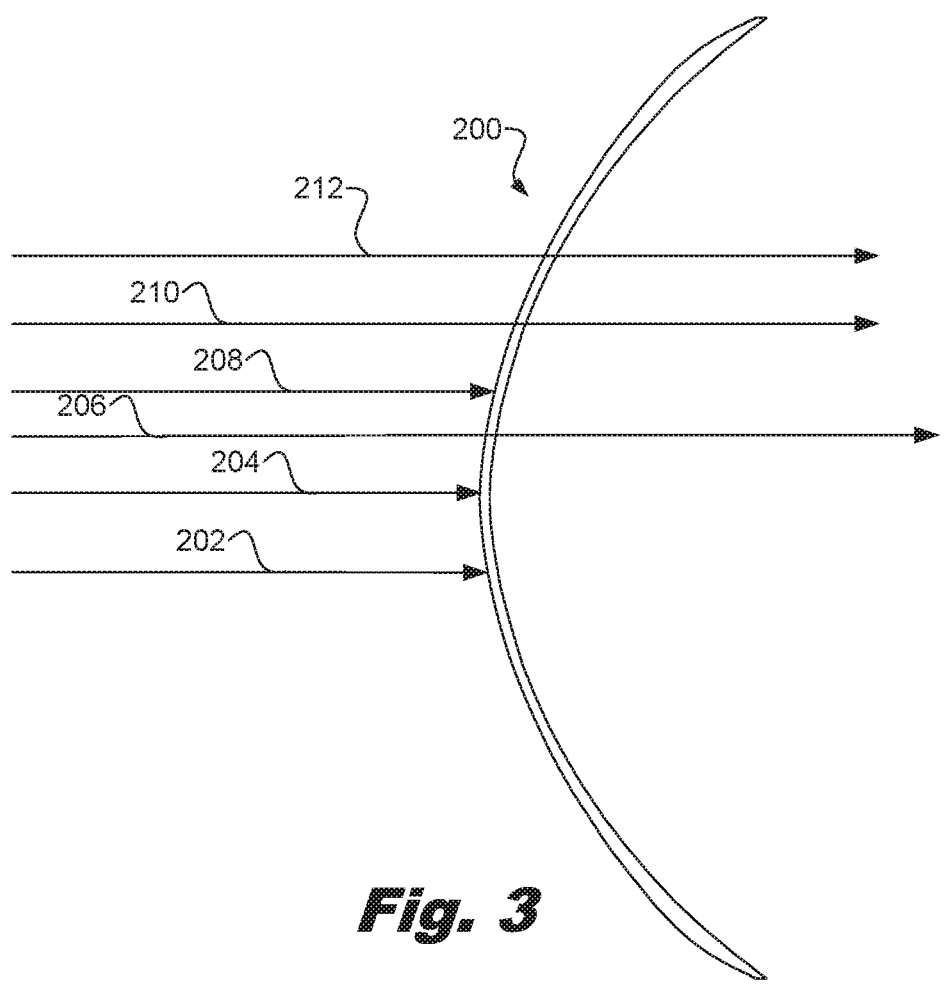
FIG. 3 is a cross-sectional view of a contact lens.

FIG. 3 depicts an example of a contact lens 200 that has transmittance characteristics. The contact lens 200 may be substantially similar to and include some or all of the feature of any of the contact lenses described herein. In this example, UV-A light is schematically represented with arrow 202, UV-B light is schematically represented with arrow 204, violet light is schematically represented with arrow 206, blue light is schematically represented with arrow 208, green light is schematically represented with arrow 210, and yellow light is schematically represented with arrow 212. In this example, the contact lens 200 includes violet light, green light, and yellow light through the contact lens. In this example, the contact lens 200 includes the filtering characteristic of blocking at least some of the UV-A light, UV-B light, and blue light from passing through the contact lens. In some examples, the contact lens 200 may include a transmittance characteristic of transmitting at least some light with wavelengths below 400 nanometers through the body. In some examples, the contact lens 200 may include a transmittance characteristic of transmitting at least some light with wavelengths below 500 nanometers through the body. In this example, the violet light, which may include wavelengths between 360 nanometers and 400 nanometers, or between 360 nanometers and 380 nanometers, may be transmitted through the contact lens 200.

The transmittance characteristics may include transmitting at least some of the light with wavelength ranges between 360 nanometers and 400 nanometers. The transmittance characteristics may include transmitting at least some of the light with wavelength ranges between 360 nanometers and 370 nanometers, transmitting at least some of the light with wavelength ranges between 370 nanometers and 380 nanometers, transmitting at least some of the light with wavelength ranges between 380 nanometers and 390 nanometers, transmitting at least some of the light with wavelength ranges between 390 nanometers and 400 nanometers, or combinations thereof, for example transmitting at least some of the light with wavelength ranges between 360 nanometers and 380 nanometers.

The transmittance characteristic may include transmitting 100 percent of the light with wavelengths between 360 nanometers and 400 nanometers through the body of the contact lens, transmitting at least 90 percent of the light with wavelengths between 360 nanometers and 400 nanometers through the body, transmitting at least 80 percent of the light with wavelengths between 360 nanometers and 400 nanometers through the body, transmitting at least 70 percent of the light with wavelengths between 360 nanometers and 400 nanometers through the body, transmitting at least 50 percent of the light with wavelengths between 360 nanometers and 400 nanometers through the body, transmitting at least another percentage of light with wavelengths between 360 nanometers and 400 nanometers through the contact lens.

The transmittance characteristic may include transmitting 100 percent of the light with wavelengths above 360 nanometers through the body of the contact lens, transmitting at least 90 percent of the light with wavelengths above 360 nanometers through the body, transmitting at least 80 percent of the light with wavelengths above 360 nanometers through the body, transmitting at least 70 percent of the light with wavelengths above 360 nanometers through the body, transmitting at least 50 percent of the light with wavelengths above 360 nanometers through the body, transmitting at least another percentage of light with wavelengths above 360 nanometers through the contact lens.

In some examples, the transmittance characteristics may also include transmitting at least some of the light with wavelengths at or below about 280 nanometers. The transmittance characteristic may include transmitting 100 percent of the light with wavelengths below 280 nanometers through the body of the contact lens, transmitting at least 90 percent of the light with wavelengths below 280 nanometers through the body, transmitting at least 80 percent of the light with wavelengths below 280 nanometers through the body, transmitting at least 70 percent of the light with wavelengths below 280 nanometers through the body, transmitting at least 50 percent of the light with wavelengths below 280 nanometers through the body, transmitting at least another percentage of light with wavelengths below 280 nanometers through the contact lens.

Figure 4:
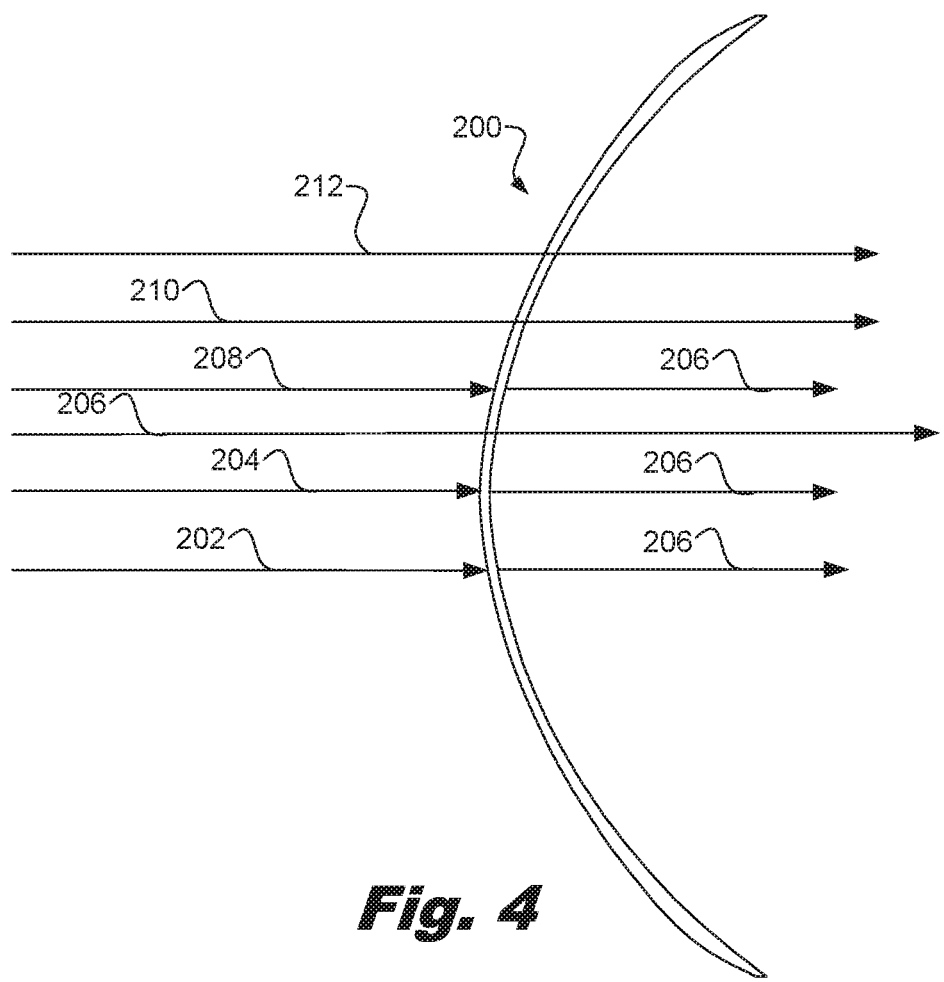
FIG. 4 is a cross-sectional view of a contact lens.

FIG. 4 depicts an example of a contact lens 200 that has transmittance characteristics. The contact lens 200 may be substantially similar to and include some or all of the feature of any of the contact lenses described herein. In this example, UV-A light is schematically represented with arrow 202, UV-B light is schematically represented with arrow 204, violet light is schematically represented with arrow 206, blue light is schematically represented with arrow 208, green light is schematically represented with arrow 210, and yellow light is schematically represented with arrow 212. In this example, the contact lens 200 includes violet light, green light, and yellow light through the contact lens. In this example, the contact lens 200 includes the filtering characteristic of absorbing at least some of the UV-A light, UV-B light, and/or blue light incident upon the lens and preventing at least some of the UV-A, UV-B, and/or blue light from passing through the contact lens. Further, in this example, contact lens 200 includes the filtering characteristic of emitting at least some of the energy absorbed from incident UV-A, UV-B, and/or blue light as violet light, depicted as arrow 206. In some examples, at least some of the violet light emitted from the lens due to the absorption of UV-A, UV-B, and/or blue light may be incident upon the eye as shown. In some examples, contact lens 200 thereby achieves the effect of blocking at least some UV-A light, UV-B light, and/or blue light and enhancing the exposure of the eye to violet light.

In some examples this effect may be achieved, for example, with the inclusion of a fluorescing agent in the contact lens 200. In some examples, such a fluorescing agent may absorb and/or block UV-A, UV-B, and/or blue light and may fluoresce or emit violet light. As described herein, in some examples the contact lens 200 may include a fluorescing agent such as Indo-1. In some examples, an appropriate fluorescing agent may be used as a blocking agent or a fluorescing agent may be used in addition to one or more other blocking agents.

In some examples, the contact lens may include a transmittance characteristic of enhancing at least some light with wavelengths below 400 nanometers, for example by fluorescence, as described herein. As used herein, enhancing or enhancement may include exposing the eye to an amount or intensity of one or more wavelengths of light that is greater than the natural amount or intensity of said one or more wavelengths incident upon the lens. In some examples, the contact lens may include a transmittance characteristic of enhancing at least some light with wavelengths below 500 nanometers. In this example, the violet light, which may include wavelengths between 360 nanometers and 400 nanometers, or between 360 nanometers and 380 nanometers, may be enhanced by a fluorescing agent in the contact lens 200.

The transmittance characteristics may include enhancing at least some of the light with wavelength ranges between 360 nanometers and 400 nanometers. The transmittance characteristics may include enhancing at least some of the light with wavelength ranges between 360 nanometers and 370 nanometers, transmitting at least some of the light with wavelength ranges between 370 nanometers and 380 nanometers, transmitting at least some of the light with wavelength ranges between 380 nanometers and 390 nanometers, transmitting at least some of the light with wavelength ranges between 390 nanometers and 400 nanometers, or combinations thereof, for example transmitting at least some of the light with wavelength ranges between 360 nanometers and 380 nanometers. The transmittance characteristic may further include blocking or absorbing at least some of the light with wavelength ranges below 360 nanometers and/or above 400 nanometers, for example as described herein with respect to FIGS. 2 and 3.

In some examples, a contact lens may include a tint, for example by the inclusion of one or more dyes in the contact lens. In some examples, a tint may enhance a desired part of the spectrum of light via selective filtrations. In some examples, a contact lens including a tint may have transmittance characteristics including enhancing at least some of the light with wavelength ranges between 360 nanometers and 400 nanometers. The transmittance characteristics may include enhancing at least some of the light with wavelength ranges between 360 nanometers and 370 nanometers, transmitting at least some of the light with wavelength ranges between 370 nanometers and 380 nanometers, transmitting at least some of the light with wavelength ranges between 380 nanometers and 390 nanometers, transmitting at least some of the light with wavelength ranges between 390 nanometers and 400 nanometers, or combinations thereof, for example transmitting at least some of the light with wavelength ranges between 360 nanometers and 380 nanometers.

In some examples, a contact lens may enhance a desired wavelength or range of wavelengths of light by, for example, thin-film interference. In some examples, one or more surface of the contact lens may include a thin film having a thickness configured to reflect or otherwise block at least some UV-A, UV-B, and/or blue light from being transmitted through the lens. For example, in some examples a contact lens may include a thin film, such as a polymer thin film, having a thickness that is a multiple of a half-wavelength of UV-A, UV-B, and/or blue light. For example, some UV light has a wavelength of 300 nanometers and a contact lens may include a thin film having a thickness of 150 nanometers, 300 nanometers, 450 nanometers, or some other multiple of half of the wavelength of the UV light, that is, 150 nanometers. Further, in some examples, the thin film may have an index of refraction different than the index of refraction of the contact lens body.

FIGS. 5-8 illustrate various components that can be used in certain examples for making a contact lens as described herein, such as contact lens 100, 200. A liquid lens material 52 can be applied to a profile 54 of the mold 42. The mold 42 with the liquid lens material 52 can be loaded into a spinning structure 68 that is configured to spin the mold 42 so that the liquid lens material 52 centrifugally spreads across the profile 54 into the desired shape of the contact lens. A curing agent (e.g., temperature, actinic radiation, or another type of curing agent) is exposed to the liquid lens material 52 while the mold 42 is spinning. As a result, the liquid lens material 52 hardens into the contact lens.

Figure 5:
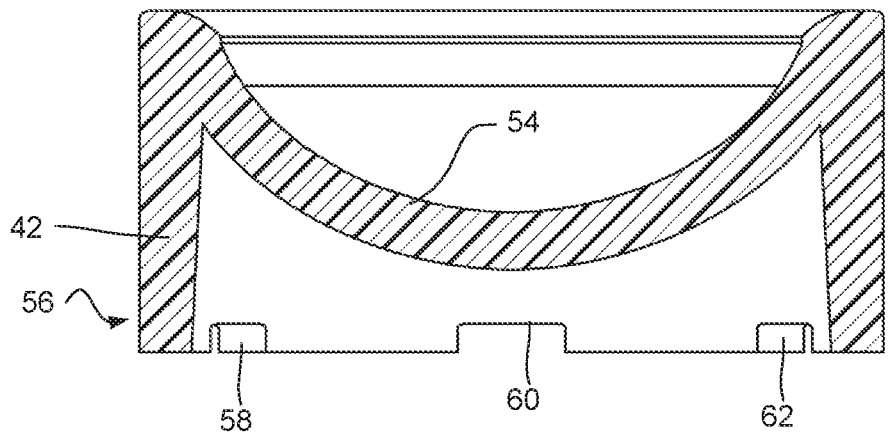
FIG. 5 is a cross-sectional view of a mold for an ocular lens.

FIG. 5 is a cross-sectional view of one example of a mold for a contact lens according to the principles of the present disclosure. In this example, the mold 42 has a base 56 with multiple cut outs 58, 60, 62 that are spaced and shaped to interlock with an internal surface of a spinning structure during a later stage of manufacturing. The profile 54 of the mold 42 is shaped to form the anterior surface of the contact lens.

Figure 6:
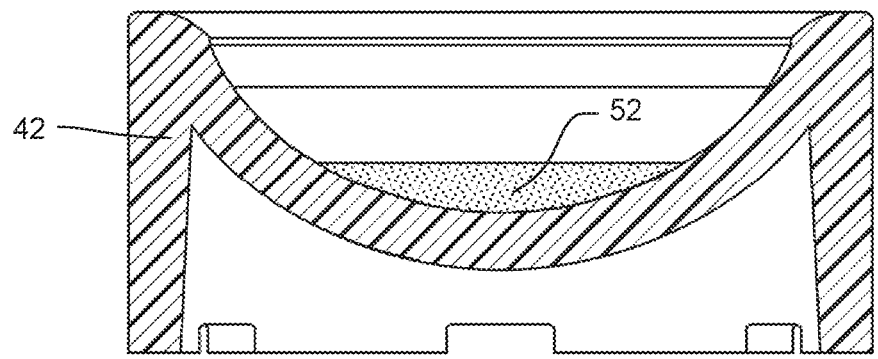
FIG. 6 is a cross-sectional view of the mold of FIG. 5 with a liquid lens material.

FIG. 6 is a cross-sectional view of one example of a mold 42 with a liquid lens material 52 according to the principles of the present disclosure. In this example, the liquid lens material 52 is deposited into the profile 54 of the mold.

The liquid lens material 52 can be made from any material suitable for use in contact lenses. For example, the liquid lens material 52 can be made of any silicone material and/or hydrogel material. Such material may be formed of polymers, such as tefilcon, tetrafilcon A, crofilcon, helfilcon A&B, mafilcon, polymacon, hioxifilcon B, lotrafilcon A, lotrafilcon B, galyfilcon A, senofilcon A, sifilcon A, comfilcon A, enfilcon A, lidofilcon B, surfilcon A, lidofilcon A, alfafilcon A, omafilcon A, vasurfilcon A, hioxifilcon A, hioxifilcon D, nelfilcon A, hilafilcon A, acofilcon A, bufilcon A, deltafilcon A, phemfilcon A, bufilcon A, perfilcon, etafilcon A, focofilcon A, ocufilcon B, ocufilcon C, ocufilcon D ocufilcon E, ocufilcon F, phemfilcon A, methafilcon A, methafilcon B, vilfilcon A, other types of polymers, monomers, or combinations thereof. These materials may include various combinations of monomers, polymers, and other materials to form the liquid lens material.

In some examples, the materials that make up the liquid lens material may include at least one blocking agent that blocks light within a desired wavelength. In some examples, a blocking agent that blocks blue light is incorporated into the liquid lens material. Any appropriate type of blocking agent for blue light may be incorporated into the lens. In some examples, the blocking agent for blue light includes triphenylphosphine, a colored dye, another type of blocking agent, or combinations thereof. In some examples, a blocking agent that blocks UV light is incorporated into the liquid lens material. In some examples, two or more types of blocking agents may be incorporated into the liquid lens material.

In some examples, another type of blocking agent may be used to block desired wavelengths of light that are below around or below 360 nanometers, or below around or below 280 nanometers. These blocking agents may be used to block UV or blue light wavelengths. In these examples, any appropriate type of blocking agent may be used to block these wavelengths, such as titanium dioxide, oxybenzone, octyl salicylate, octocrylene, octyl methoxycinnamate, RUVA-93, thermoplastic olefins, dyes such as yellow dye #15, benzotriazole based agents such as 2-[3-(2H-Benzotriazol-2-yl)-4-hydroxyphenyl]ethyl methacrylate, other blocking agents, or combinations thereof.

The blocking agents for the blue light, the blocking agents for the UV light, or blocking agents for other types of light may be incorporated into the contact lens' body in any appropriate amount. Any of these blocking agents may make up at least 1.0 percent of the contact lens by weight, at least 5.0 percent of the contact lens by weight, at least 10.0 percent of the contact lens by weight, at least 15.0 percent of the contact lens by weight, at least 25.0 percent of the contact lens by weight, another appropriate amount by weight, or combinations thereof.

In one example, the liquid lens material is made of hydrogel polymers without any silicone. This may be desirable to increase the wettability of the contact lens. In another example, the liquid lens material is made of silicone hydrogel material.

The contact lens can be shaped and sized based on a variety of factors, including the shape and size of the user's eye and various optical properties to be achieved by a central portion of the contact lens. In some examples, the total thickness of the contact lens can be approximately 0.1 mm to approximately 0.14 mm. The thickness of the contact lens may gradually vary at different locations on the contact lens. For example, the contact lens can be thicker near the outer edge of the contact lens than in the central portion of the contact lens.

Figure 7:
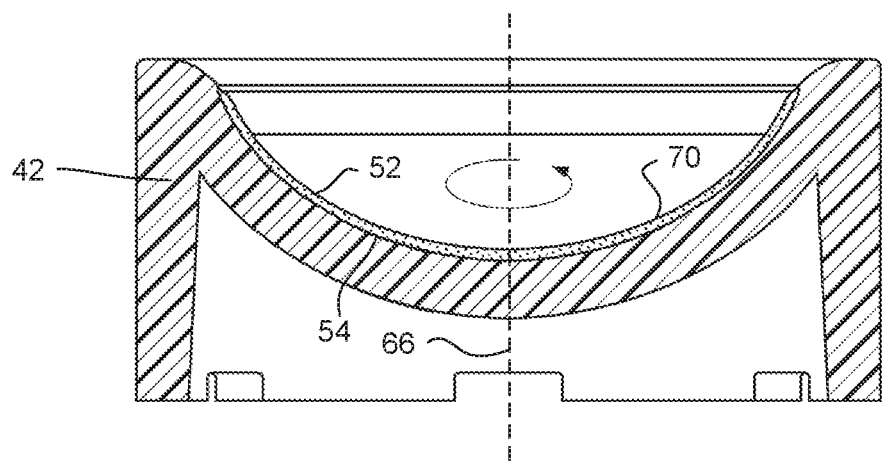
FIG. 7 is a cross-sectional view of the mold of FIG. 5 with a liquid lens material centrifugally spreading across a profile of the mold.
Figure 8:
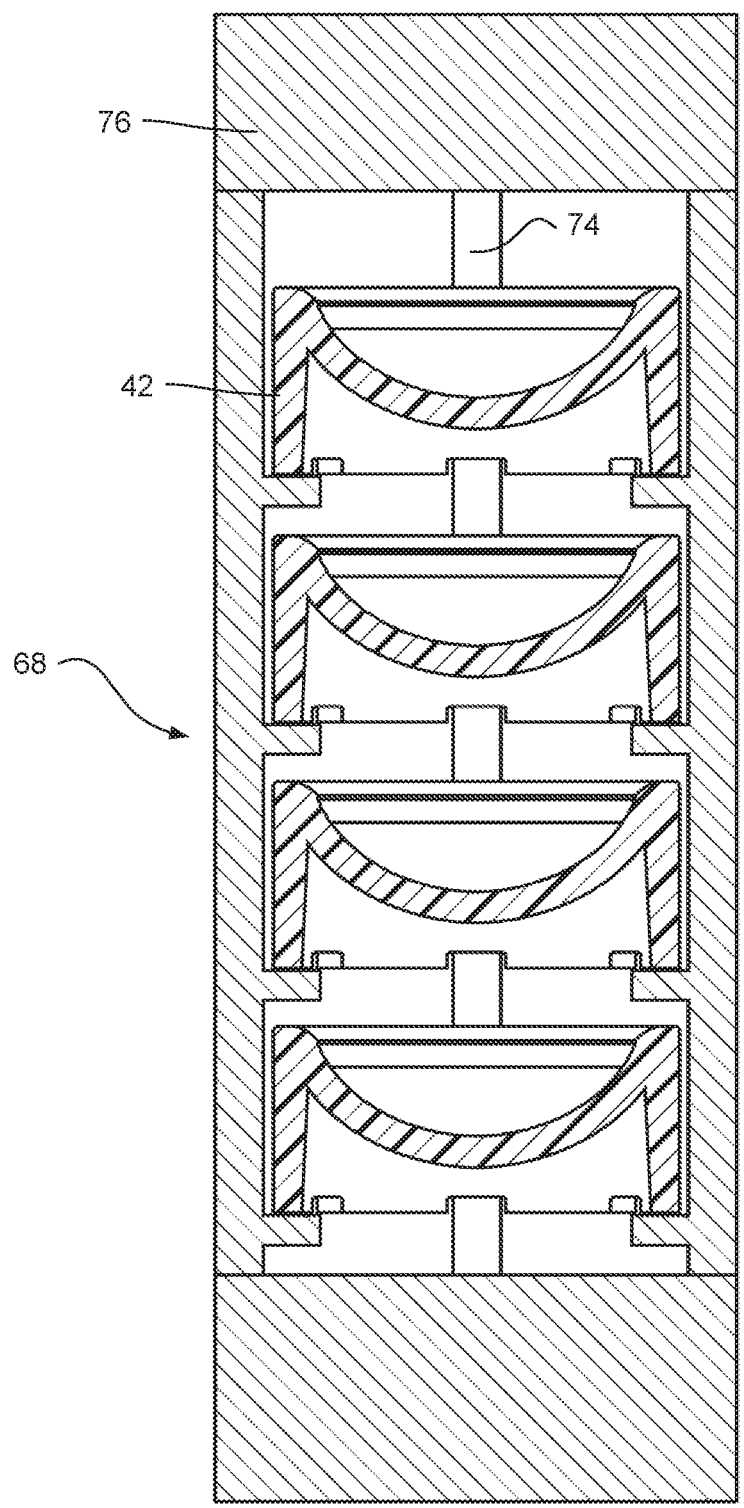
FIG. 8 is a cross-sectional view of a spinning structure used to shape and cure molds for making ocular lenses.

FIGS. 7 and 8 are a cross-sectional view of a mold 42 with a liquid lens material 52 centrifugally spreading across a profile 54 of the mold 42 according to the principles of the present disclosure. In this example, the mold 42 is spun around a central axis 66 within a spinning structure (68, FIG. 7). The spinning structure 68 is rotated at a speed and in such a way that forms the desired posterior surface 70 of the contact lens.

The spinning structure 68 includes a central loading region that can receive the molds 42 that contain the liquid lens material 52. The central loading region may be formed by a glass tube, a metal tube, or another type of structure that can retain the molds 42 in a stacked orientation. In examples where actinic radiation is used as the curing agent, the spinning structure 68 may have an opaque material, a semi-transparent material, or a transparent material that include a sufficient amount of openings to allow the actinic radiation into the central loading region. In the example of FIG. 8, the spinning structure 68 includes multiple guide posts 74 that retain the molds 42 in a stacked orientation. The spinning structure 68 also includes a region 76 that can be used to attach to a spinning driver, such as a motor.

The spinning structure 68 is programmed to rotate in a precise manner to form the desired posterior surface 70 of the contact lens, which is the surface of the contact lens that is intended to contact the eye. The program that causes the spinning structure 68 to rotate can be modified to create a desired profile for different users based on each user's individual prescription. The curing agent is applied to the liquid lens material 52 while the spinning structure 68 rotates the molds 42. As a result, the contact lens is formed while the spinning structure rotates. In some examples, the contact lenses are fully cured within the spinning structure. But, in other examples, the contact lens may be fully cured over the course of multiple curing stages. For example, the contact lens may be cured in the spinning structure 68 to a point where the liquid lens material retains its shape but is not fully cured. At this stage, the mold with the contact lens may be removed from the spinning structure to finish curing in an environment that is cost effective. A spinning structure that is compatible with the principles described herein is described in U.S. Pat. No. 9,193,119 issued to Stephen D. Newman. U.S. Pat. No. 9,193,119 is herein incorporated by reference for all that it discloses.

Figure 9:
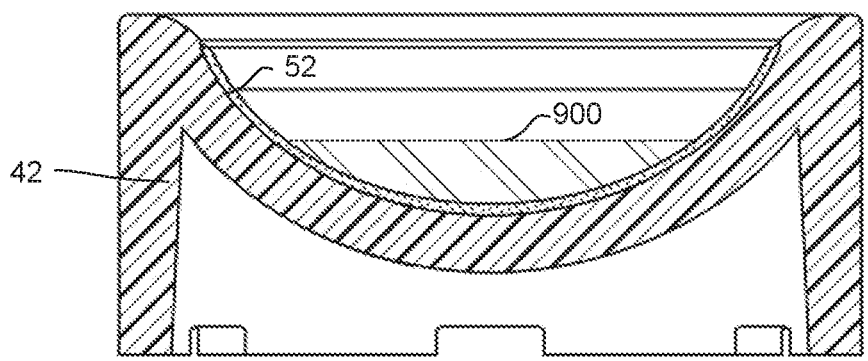
FIG. 9 is a cross-sectional view of a mold for an ocular lens.
Figure 10:
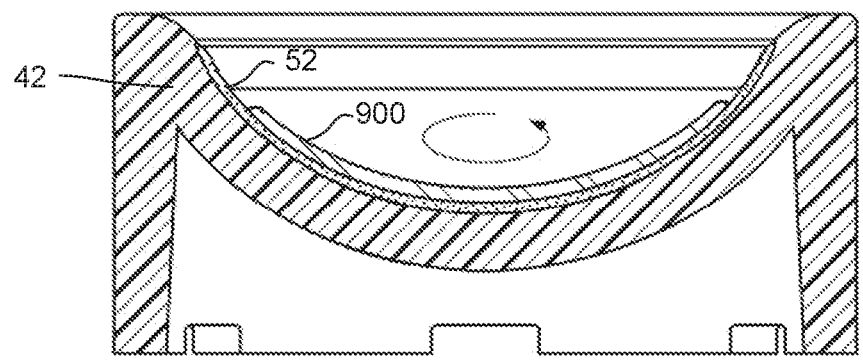
FIG. 10 is a cross-sectional view of the mold of FIG. 9 with a liquid lens material.

FIG. 9 is a cross-sectional view of one example of a mold for a contact lens according to the principles of the present disclosure. In this example, the liquid lens material 52 is just partially cured before a second material 900 is added. In this example, the second material 900 is another liquid lens material and is added to the posterior side of the partially cured liquid lens material 52. FIG. 10 depicts the mold 42 spinning again which causes the second material 900 to spread out and cover at least a portion of the posterior side of the partially cured liquid lens material 52. In some examples, the second material 900 is spread out to cover the entire posterior side of the liquid lens material 52, but in other examples, the second material 900 is just spread out across a portion of the posterior side's surface area. The second material 900 may be cured in place while the second material 900 is spread out.

While shown as only providing a mold surface for the front surface, in some embodiments, an additional mold part can be provided that supplies the shape of back surface of a contact lens, such as in a cast molding system. Such mold pieces can be clamped together to form contact lenses by applying pressure from both sides to force the liquid lens material therebetween outward to fill the mold cavity and form the shape of the contact lens. The liquid lens solution can be cured in the mold, such as via exposure to a selected wavelength of light (e.g., UV light). Any flashing from the molding process can be trimmed after the contact lens is cured, or as a function of combining the two portions of the mold together.

In some examples, the first liquid lens material does not include at least one of the blocking agents, while the second material includes the missing blocking agent. For example, the first liquid lens material may not include a blue blocking agent, but the second material includes the blue blocking agent. In another example, the liquid lens material does not include at least one of the UV blocking agents, but the second material includes that UV blocking agent. In another example, the liquid lens material may include the blocking agent, but in a different concentration than in the second material. One advantage of depositing a liquid lens material without blocking agents is that the blocking agents may affect the curing rate of the liquid lens material. The second material may be the same material as the liquid lens material, but just a smaller volume and a higher concentration of blocking agents. In this example, just a smaller portion of the lens material has a curing rate affected by the blocking agent.

In yet another example, the liquid lens material may include a first type of blocking agent and the second material may include a second type of blocking agent. Separating the blocking agents from each other by depositing them separately and partially curing the one of the blocking agents in the liquid lens material before adding the second layer with the second type of blocking agent may prevent the blocking agents from mixing, chemically reacting with each other, and/or otherwise interfering with each other. Another reason for separating the deposition of the different blocking agents is that one blocking agent may affect the curing rate based on a first type of radiation used to cure the lens' body. For example, the liquid lens body may be cured with a UV light. In that example, a blue blocking agent may be incorporated into the liquid lens material. Blue light may be used to cure the second material. In this example, the second material may include the UV blocking agents.

In some examples, blue light may be used to cure a material incorporating a blue light blocking agent. In some examples, the blue blocking agent affects the curing rate when blue light is cured, but in other examples, the curing rate is not affected with blue light is used to cure a material containing a blue blocking agent.

In some examples, UV light may be used to cure a material incorporating a UV light blocking agent. In some examples, the UV blocking agent affects the curing rate when UV light is cured, but in other examples, the curing rate is not affected with UV light is used to cure a material containing a UV blocking agent.

Figure 11:
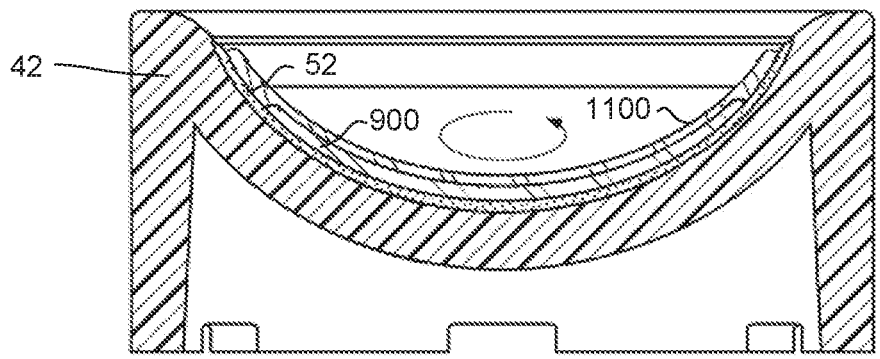
FIG. 11 is a cross-sectional view of the mold of FIG. 9 with a liquid lens material centrifugally spreading across a profile of the mold.

FIG. 11 depicts an example where an additional layer of liquid lens material is added to the contact lens in the mold 42. The additional liquid lens material 1100 may be the same type of material as the first liquid lens material or it may be a different type of material. The first liquid lens material may be partially cured prior to adding the second material 900 and the additional liquid lens material. In some examples, the second material 900 and the additional liquid lens material 1100 are cured at the same time. In other examples, the second material 900 is at least partially cured before the additional liquid lens material is cured.

In one example, the first liquid lens material 52 is added to the mold 42 and is spun and partially cured. The second material 900 is added to the partially cured liquid lens material and is also partially cured. The additional liquid lens material is added to the partially cured second material and the partially cured first liquid lens material. Then the additional liquid lens material may be cured so that the additional liquid lens material cross links to a peripheral portion of the first liquid lens material. This process may encapsulate the second material. In those examples where the second material includes a blocking agent that can be leached out of the second material into the user's eye when being worn by the user, the additional liquid lens material and the first liquid lens material may be a barrier that prevents the migration of that blocking agent.

In some examples, the blocking agent does not have the characteristics of migrating through the body of the lens under the conditions that a user typically wears contact lens. In this example, a contact lens of a single layer may be desirable.

While some of the examples above have been described with the second material being a liquid lens material, the second material may take any appropriate form. For example, the second lens material may be a solid material that is shaped on a lathe. In another example, the second lens material may be a sheet of material. In yet another example, the second material may include a partially cured material that was cured in a different environment than the first liquid lens material.

Further, the second lens material may not be added to the partially cured first lens material while still in the mold. The partially cured first liquid lens material may be removed from the mold and transferred to another environment before the second material is added. In some examples, the first liquid lens material may be put back into the same mold or a different mold before the second material is at least partially cured.

Figure 12:
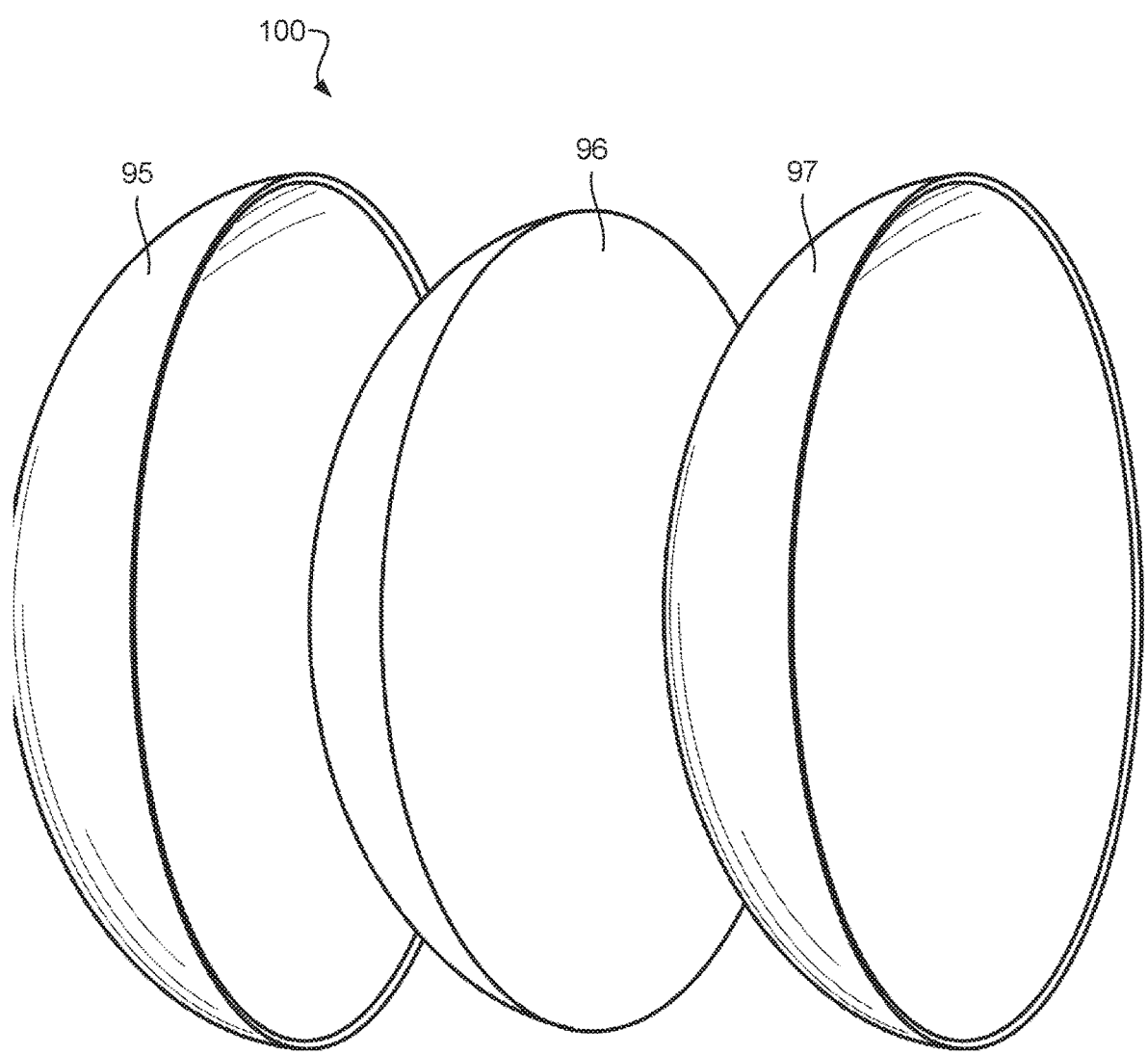
FIG. 12 is an exploded view of a contact lens.

FIG. 12 depicts an example of a contact lens 100 with multiple layers 95, 96, 97. The anterior layer 95 and the posterior layer 97 may be made of a barrier material that prevents migration of a light wavelength blocking agent, for example included in layer 96. In some examples, the anterior layer 95 and the posterior layer 97 may be made of materials that provide greater oxygen permeability and may be more comfortable against the eye. The layers 95, 96, and 97 may be attached to each other through a cross linking process. In some examples, the anterior and posterior layers 95, 97 may be larger than the intermediate layer 96. In these such examples, the intermediate layer may be large enough to cover the portion of the eye that is intended to receive the pressure from the contact lens that is sufficient to slow myopia progression or prevent myopia onset.

Figure 13:
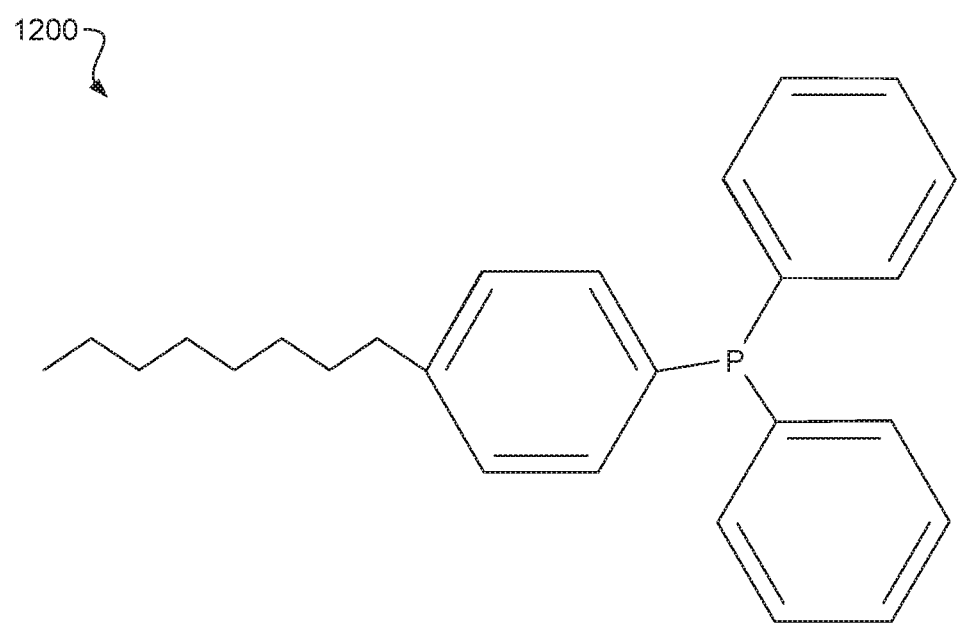
FIG. 13 is a schematic view of the chemical formula of a blocking agent.

FIG. 13 depicts an example of triphenylphosphine 1200, a blocking agent that may be used to block blue light, connected to a polymer chain. Triphenylphosphine is often abbreviated as $P(C_6H_5)_3$. Triphenylphosphine may be relatively stable in ambient air and may be colorless at room temperatures. In some examples, triphenylphosphine may undergo a slow oxidation in air to form an oxide. In some examples, the formation of the oxide can be avoided by mixing the blocking agent in an inert environment. In some examples, the oxidation reactions are minimized after the triphenylphosphine or other blocking agent is incorporated into the polymer chains that form the contact lens body. But, in some examples, the lens material containing the blocking agent may be cured in an inert environment to avoid or reduce oxidation. In some examples, the layer of the contact lens containing the blocking agent is encapsulated within layers that do not contain the blocking agent, which prevents oxidation. In some examples, the blocking agent in an oxidized form and is compatible with both being part of a contact lens and still blocking the desired wavelengths.

While this example has been described with reference to a particular type of blocking agent, any appropriate type of blocking agent may be used in accordance with the principles described herein. For example, another type of transparent and/or clear blocking agent for blocking blue light and/or blocking UV light may be used. In other examples, a blocking agent may color the contact lens or regions thereof.

Figure 14:
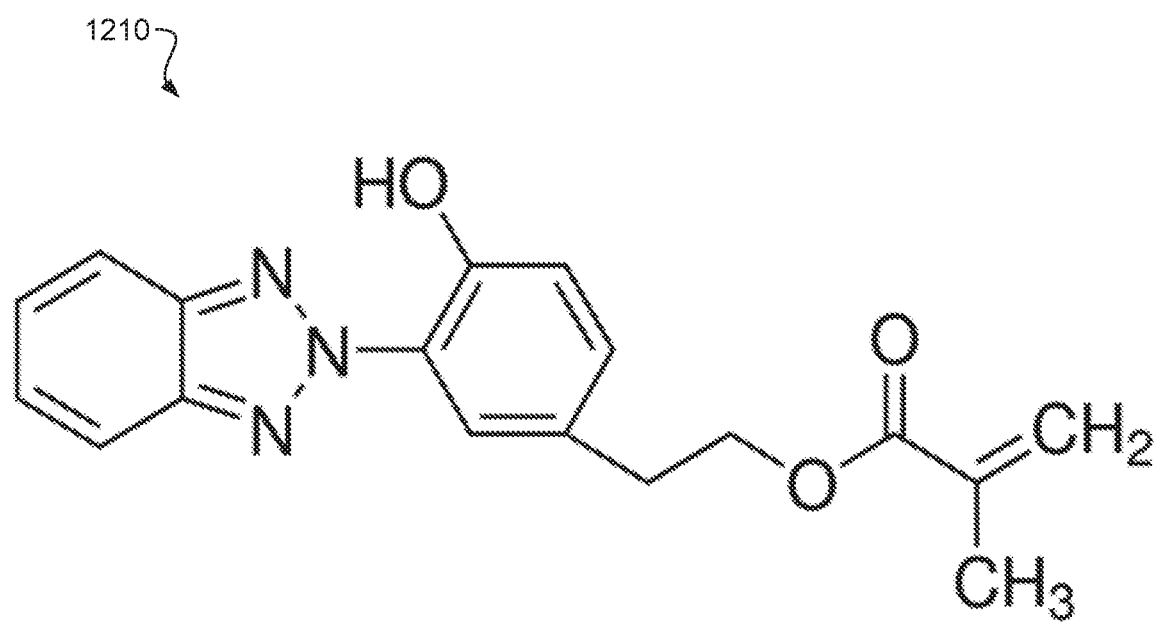
FIG. 14 is a schematic view of the chemical formula of a blocking agent.

FIG. 14 depicts an example of Norbloc 7966, also referred to as 2-[3-(2H-Benzotriazol-2-yl)-4-hydroxyphenyl]ethyl methacrylate, a benzotriazole based blocking agent that may be used to block UV light. Benzotriazole based UV blocking agents may have a very strong, or sharply defined, absorption cut-off. For example, Norbloc 7966 absorbs UV light having wavelengths up to about 385 nanometers to 390 nanometers, at which point the absorption drops off rapidly. This absorption profile thus allows for Norbloc 7966 to effectively block UV light while permitting transmission of a high percentage of visible light, as described herein.

Further, the point at which absorption rapidly falls away may be modified as desired by modifying the molecule to include one or more substituent groups. For example, an electron-donating substituent group at the 5 position may shift the absorption cut-off to a longer wavelength. In some examples, the substituent group may be chlorine (Cl) at the 5 position, in which case the absorption cut-off may be at 400 nanometers. In some examples, a styrene moiety may be substitute for the ethyl methacrylate group in the molecule shown in FIG. 14. In some examples, an electron donating substituent group may be included at the 5 position, for example a Cl group. In some examples, such a UV blocking agent may have an absorption cut-off of 400 nanometers. In some examples, an electron withdrawing substituent group may alternatively be placed at the 5 position. Such a substituent group may have the effect of shifting the absorption cut off to a shorter wavelength. For example, in some examples a nitro group ($-NO_2$) or a sulfonate group ($-SO_3Na$) may be used as a substituent at the 5 position which may shift the absorption cut off to about 370 nanometers. In some examples, one or more variants of benzotriazole based blocking agents, such as Norbloc 7966 may be included in the contact lens to selectively block desired wavelengths of light as described herein.

Figure 15:
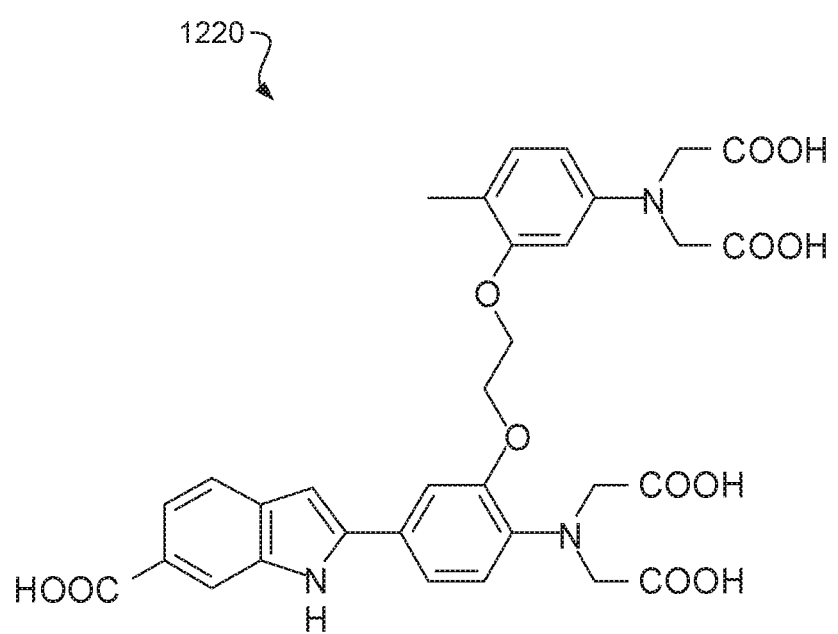
FIG. 15 is a schematic view of the chemical formula of a blocking agent.

FIG. 15 depicts an example of 2-[4-(bis(carboxymethyl) amino)-3-[2-[2-(bis(carboxymethyl)amino)-5-methylphenoxy]ethoxy]phenyl]-1H-indole-6-carboxylic acid, also referred to as Indo-1, a UV absorbing fluorescent agent that may be used to absorb UV light and emit violet light as described herein. Indo-1 is a fluorescent molecule with an emission peak of 475 nanometers. However, in the presence of calcium the emission peak of Indo-1 is shifted to 400 nanometers. Accordingly, Indo-1 and calcium may be incorporated into a contact lens as described herein in order to enhance light having a wavelength of 400 nanometers. In some examples, a contact lens including Indo-1 and calcium may absorb at least some UV light incident upon the lens and may then emit light having a wavelength of 400 nanometers towards the eye.

Figure 16:
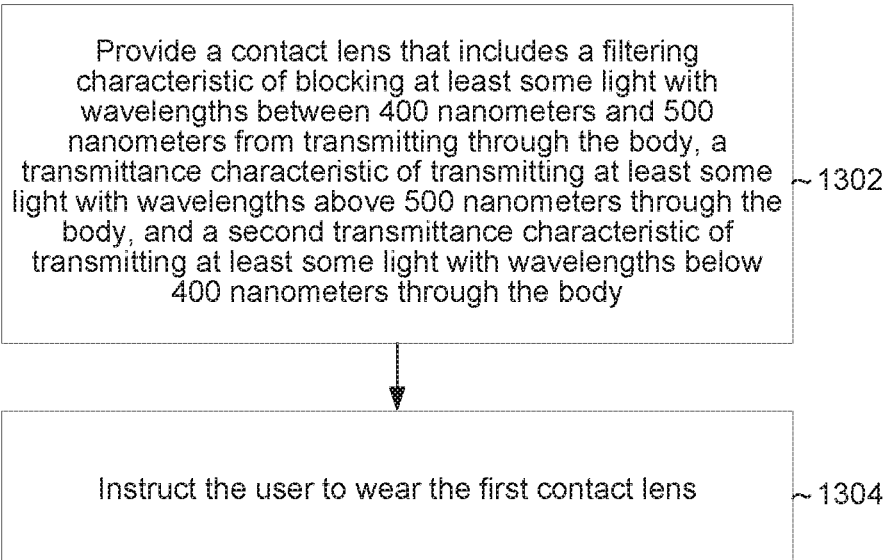
FIG. 16 is a block diagram of a method for preventing myopia onset and/or slowing a progression of myopia.

FIG. 16 depicts a method 1300 for controlling myopia progression and/or preventing myopia onset. In this example, the method 1300 includes providing 1302 a contact lens that includes a filtering characteristic of blocking at least some light with wavelengths between 400 nanometers and 500 nanometers from transmitting through the body, a transmittance characteristic of transmitting at least some light with wavelengths above 500 nanometers through the body, and a second transmittance characteristic of transmitting at least some light with wavelengths below 400 nanometers through the body; and optionally instructing 1304 the user to wear the first contact lens.

At block 1302, a contact lens is provided to the user. The contact lens includes at least one blocking agent that blocks light of certain wavelengths from entering the eye while also permitting light of desirable wavelengths to be transmitted through the body of the contact lens and into the user's eye. In some examples, the second transmittance characteristic includes transmitting at least some light with wavelengths between 360 nanometers and 400 nanometers. In some examples, an additional blocking agent may be incorporated into the contact lens to block at least some of the light with wavelengths below 360 nanometers.

In block 1304, the user is instructed to wear the contact lens. The desired effect of slowing myopia progression and/or preventing myopia onset may be accomplished by wearing the contact lens in environments where violet light is present, while filtering out blue light and/or UV light. The violet light may provide a biological feedback that prevents myopia from forming in the first place or from progressing.

In some examples, the presence of violet light may cause myopia already in progression to slow its progression.

The user may be instructed to wear the contact lens throughout a period of life that corresponds with the eye's axial growth. After that period of life is over, the user may be instructed that the user may discontinue wearing the contact lens. In some examples, the period that corresponds with the eye's axial growth may be over when the user turns 18 years old. As a result, the user, in some examples, may be instructed to discontinue use around his or her 18th birthday. In some examples, the user may optionally continue to wear the contact lens even after the period of life that corresponds with the eye's axial growth is over, so as to reduce or prevent adult onset myopia or other similar ocular issues. In some examples, the user may choose to wear the contact lens for a desired period after the period of life that corresponds with the eye's axial growth.

The user may be instructed to wear the contact lens if the user has a hereditary link to developing myopia even if the user has not be diagnosed with myopia. In some examples, the user may be instructed to wear the contact lens if the user has an environmental, genetic, biological, sociological, or any other factor or combination of factors that may lead to the onset of myopia even if the user has not be diagnosed with myopia. A potential environmental factor for developing myopia includes living in an indoor environment with only man-made light sources that do not a high amount of violet light.

FIG. 17 depicts an example of method 1400 for making a contact lens. In this example, the method 1400 includes applying 1402 a liquid lens material into a spin casting mold where the liquid material includes a blocking agent that has a characteristic of blocking at least some light with wavelengths between 400 nanometers and 500 nanometers from passing through the liquid lens material, and spinning 1404 the spin casting mold. While the current process is primarily disclosed with regard to a spin casting process, the present material can be used and manufactured in any number of contact lens forming processes, including, but in no way limited to, spin casting, cast molding (both non-assembled and assembled type), and lathing. In some examples, a hybrid process including spin casting or cast moulding followed by lathing.

At block 1402, the liquid lens material is applied to the mold. The liquid lens material may include a blocking agent that filters out and/or blocks light of a pre-determined wavelength. The blocking agent may block at least a portion of blue light, UV-A light, UV-B light, light with different wavelengths, or combinations thereof. The blocking agent may transmit light of other wavelengths through the contact lens body, such as violet light and all other light within the visible light spectrum with wavelengths greater than the wavelengths of blue light.

Figure 18:
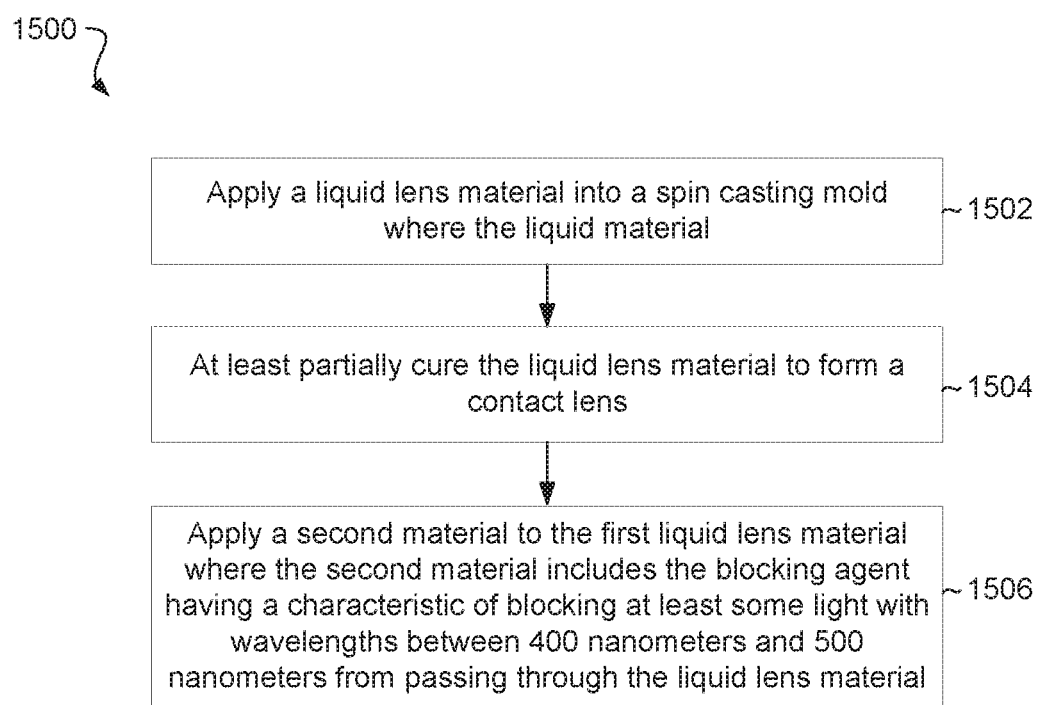
FIG. 18 is a block diagram of a method for making a contact lens.

FIG. 18 depicts an example of method 1500 for making a contact lens. In this example, the method 1500 includes applying 1502 a liquid lens material into a spin casting mold, at least partially curing 1504 the liquid lens material to form a contact lens, and applying 1506 a second material to the first liquid lens material where the second material includes a blocking agent that has a characteristic of blocking at least some light with wavelengths between 400 nanometers and 500 nanometers from passing through the liquid lens material.

At block 1502, a liquid lens material is added to the mold. In some examples, the first liquid lens material includes a blocking agent, but in other examples the first liquid lens material is substantially free of blocking agents.

At block 1504, the first liquid lens material is at least partially cured. In some examples, the first liquid lens material undergoes the curing process while the first liquid lens is being spin cast. At least partial curing may cause the liquid lens material to solidify into a desired shape, but still have some molecular bonding left unbonded for a later stage in the manufacturing process. In some examples, the first liquid lens material is fully cured. At least partially curing may be accomplished with an intensity of light within a specific wavelength, such as blue light, UV light, light of another wavelength, or combinations thereof.

At block 1506, the second material is applied to the first liquid lens material. In some examples, the second material is added after the first liquid lens material is at least partially cured. In some examples, the second material is a liquid material. But, in other examples, the second material may be a solid material or a gas material deposited on/into the first liquid material.

Figure 19:
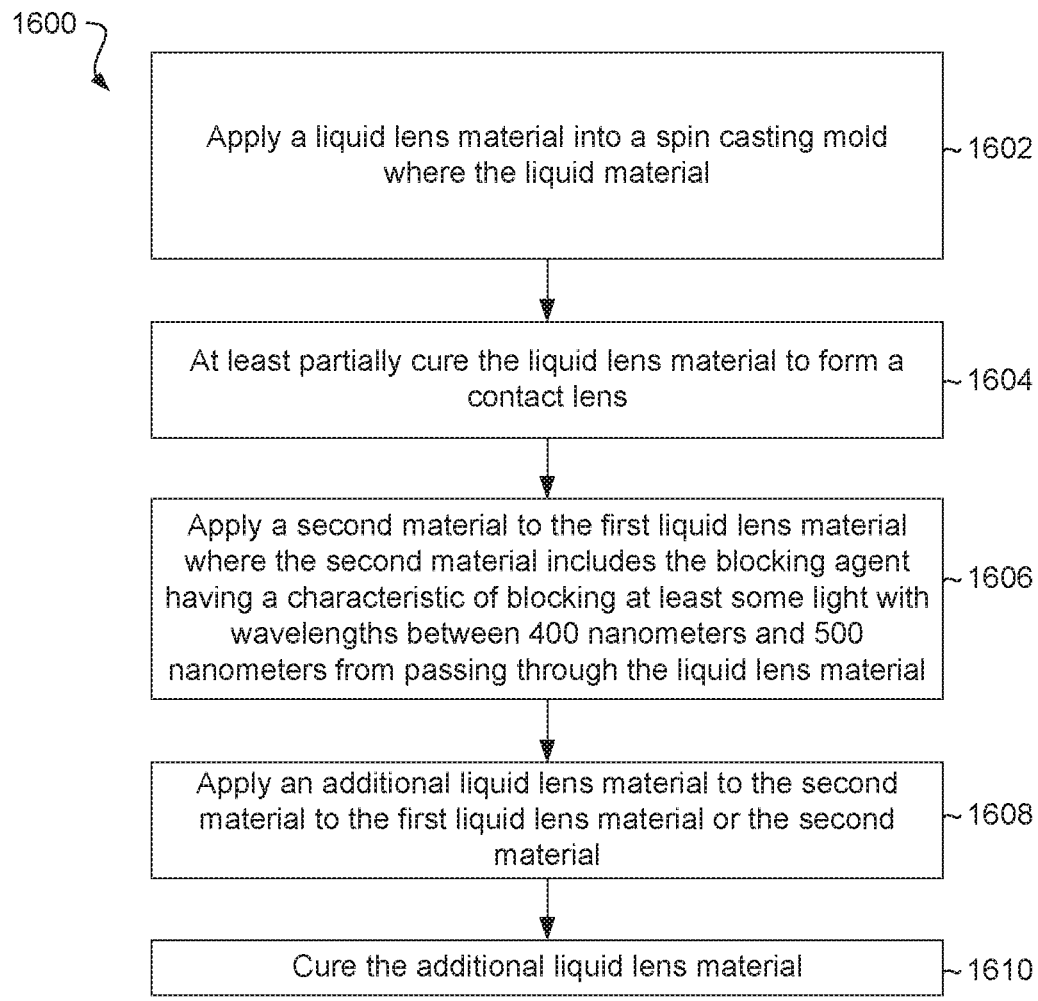
FIG. 19 is a block diagram of a method for making a contact lens.

FIG. 19 depicts an example of method 1600 for making a contact lens. In this example, the method 1600 includes applying 1602 a liquid lens material into a spin casting mold, at least partially curing 1604 the liquid lens material to form a contact lens, applying 1606 a second material to the first liquid lens material where the second material includes a blocking agent that has a characteristic of blocking at least some light with wavelengths between 400 nanometers and 500 nanometers from passing through the liquid lens material, applying 1608 an additional liquid lens material to the second material to the first liquid lens material or the second material, and curing 1610 the additional liquid lens material.

At block 1608, the additional liquid lens material may contain a blocking agent, but in other examples, the additional liquid lens material may be substantially free of blocking agents. In some examples, the additional liquid lens material may provide a barrier that prevents blocking agents from migrating from either the first liquid lens material for the second material. The additional liquid lens material, after curing, may be layer that has direct contact with the user's eye.

At block 1610, the additional liquid lens material is cured. The additional liquid lens material may crosslink with either the first liquid lens material, the second material, or combinations thereof during curing. In some examples, the same type of curing mechanism may be used to cure at this stage as was used previously to at least partially cure the first liquid lens material. For example, at each curing stage, the same blue light, same UV light, same temperature, or forth may be used for curing. Alternatively, different curing mechanisms may be used at these different stages.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A contact lens, comprising:
 a body;
 a filtering characteristic of comprising blocking at least 50% of light with wavelengths between 400 nanometers and 500 nanometers from transmitting through the body; and a transmittance characteristic of comprising transmitting at least some light with wavelengths above 500 nanometers through the body, wherein:
the body is made, at least in part, of a polymer;
the contact lens further comprises a blocking agent incorporated into the polymer, the blocking agent causing the filtering characteristic; and
the blocking agent comprises at least one of a triphenylphosphine or a triphenylphosphine derivative.

2. The contact lens of claim 1, wherein the blocking at least some of the light with wavelengths between 400 nanometers and 500 nanometers includes blocking at least 50 percent of the light entering the body of the contact lens with wavelengths between 400 nanometers and 450 nanometers from passing through the contact lens.

3. The contact lens of claim 1, wherein the blocking agent makes up at least 1.0 percent of the contact lens by weight.

4. The contact lens of claim 1, further including comprising:
an optic zone of the body; and
a peripheral zone of the body;
wherein the blocking agent is located isolated within one of the optic zone or the peripheral zone.

5. The contact lens of claim 1, wherein the polymer includes at least one of a silicone material or a hydrogel material.

6. The contact lens of claim 1, further including: comprising a second transmittance characteristic of transmitting at least some light with wavelengths below 400 nanometers through the body.

7. The contact lens of claim 6, wherein the second transmittance characteristic includes comprises transmitting at least some of the light with wavelength ranges between 360 nanometers and 400 nanometers through the body.

8. The contact lens of claim 1, further including comprising:
a third transmittance characteristic of enhancing light with wavelengths between 360 nanometers and 400 nanometers via absorption and fluorescence in the body.

9. The contact lens of claim 8, wherein the third transmittance characteristic includes comprises:
absorbing at least some of the light with wavelength ranges below 360 nanometers and above 400 nanometers; and
emitting at least some light with wavelength ranges between 360 nanometers and 400 nanometers.

10. The contact lens of claim 1, wherein the contact lens comprises an orthokeratology lens, a rigid gas permeable lens, or a soft contact lens.

11. The contact lens of claim 1, wherein:
the body includes comprises a second filtering characteristic of blocking at least some light with wavelengths below 360 nanometers from transmitting through the body, and
the light with wavelengths below 360 nanometers comprises ultraviolet light A light or ultraviolet light B light.

12. The contact lens of claim 11, further including comprising a second blocking agent that causes the second filtering characteristic.

13. The contact lens of claim 12, wherein the second blocking agent includes comprises at least one of titanium dioxide, oxybenzone, octyl salicylate, octocrylene, or benzoltriazoles.

14. The contact lens of claim 1, wherein the polymer incorporating the blocking agent comprises a first polymer material; and
further comprising a second polymer material free of the blocking agent, the second polymer encapsulating the first polymer material.

15. A method of making a contact lens, comprising:
applying a liquid lens material into a spin casting mold; and
spinning the spin casting curing the liquid lens material within the mold;
wherein the liquid lens material includes comprises a blocking agent that has a characteristic of blocking at least 50% of light with wavelengths between 400 nanometers and 500 nanometers from passing through the liquid cured lens material, wherein the blocking agent comprises at least one of a triphenylphosphine or a triphenylphosphine derivative.

16. The method of claim 15, further including: comprising at least partially curing the liquid lens material to form the contact lens.

17. The method of claim 16, wherein the contact lens has the characteristic of blocking at least some light with wavelengths between 400 nanometers and 500 nanometers from passing through the contact lens.

18. The method of making a contact lens claim 15, comprising further comprising:
applying a first liquid lens material into a spin casting mold;
spinning the spin casting mold;
at least partially curing the first liquid lens material; and
applying a second material to the first liquid lens material, where the second material includes a characteristic of blocking at least 50% of light with wavelengths between 400 nanometers and 500 nanometers from passing through the first liquid lens material contact lens.

19. The method of claim 18, where the first liquid lens material is free of a blocking agent.

20. The method of claim 18, further including comprising:
depositing an additional liquid lens material in the mold; and
curing the additional liquid lens material, wherein curing the additional liquid lens material cross links the additional liquid lens material to at least one of the first liquid lens material or the second material.

21. A contact lens, comprising:
a cast body, the cast body including:
a first blocking agent comprising at least one of a triphenylphosphine or a triphenylphosphine derivative, a filtering characteristic of blocking configured to block at least 50% of light with wavelengths between 400 nanometers and 500 nanometers from transmitting through the cast body and to have a first transmittance characteristic of transmitting at least 50% of light with wavelengths above 500 nanometers through the cast body, and a second transmittance characteristic of transmitting at least some light with wavelengths below 400 nanometers through the cast body; and
a second blocking agent configured to block at least some light with wavelengths below 360 nanometers from transmitting through the cast body;
wherein the cast body comprises one of a silicone material or a hydrogel material.

22. The contact lens of claim 21, wherein the second blocking agent comprises at least one of titanium dioxide, oxybenzone, octyl salicylate, octocrylene, or benzoltriazoles.

* * * * *